United States Patent
Sacks et al.

(10) Patent No.: US 8,768,118 B2
(45) Date of Patent: Jul. 1, 2014

(54) FIBER LASERS

(75) Inventors: Zachary Sacks, Modiin (IL); Zeev Schiffer, Petah-tikva (IL)

(73) Assignee: Elbit Systems Electro-Optics Elop Ltd., Rehovot (IL)

(*) Notice: Subject to any disclaimer, the term of this patent is extended or adjusted under 35 U.S.C. 154(b) by 307 days.

(21) Appl. No.: 12/839,289

(22) Filed: Jul. 19, 2010

(65) Prior Publication Data

US 2011/0038579 A1 Feb. 17, 2011

Related U.S. Application Data

(60) Division of application No. 12/061,594, filed on Apr. 2, 2008, now Pat. No. 7,778,290, which is a continuation-in-part of application No. 12/088,987, filed as application No. PCT/IL2006/001090 on Aug. 18, 2006, now abandoned.

(30) Foreign Application Priority Data

Oct. 2, 2005 (IL) .......................................... 171251

(51) Int. Cl.
*G02B 6/26* (2006.01)
*H01S 3/30* (2006.01)

(52) U.S. Cl.
USPC ................................................ 385/29; 372/6

(58) Field of Classification Search
USPC ................................................ 385/29; 372/6
See application file for complete search history.

(56) References Cited

U.S. PATENT DOCUMENTS

| | | | |
|---|---|---|---|
| 5,627,848 A * | 5/1997 | Fermann et al. | 372/18 |
| 5,999,673 A | 12/1999 | Valentin | |
| 6,344,921 B1 | 2/2002 | Galvanauskas et al. | 359/332 |
| 6,477,301 B1 | 11/2002 | Anthon | |
| 6,941,053 B2 * | 9/2005 | Lauzon et al. | 385/126 |
| 7,570,856 B1 * | 8/2009 | Minelly et al. | 385/126 |
| 7,764,720 B1 * | 7/2010 | Bronder et al. | 372/6 |
| 7,778,290 B2 * | 8/2010 | Sacks et al. | 372/21 |
| 2002/0172486 A1 * | 11/2002 | Fermann | 385/128 |
| 2004/0036955 A1 * | 2/2004 | Digonnet et al. | 359/341.1 |

(Continued)

FOREIGN PATENT DOCUMENTS

| | | |
|---|---|---|
| EP | 1309113 A2 | 5/2003 |
| WO | 01/38244 A1 | 5/2001 |
| WO | WO 2004/109323 | 12/2004 |
| WO | 2007/116403 A2 | 10/2007 |

OTHER PUBLICATIONS

Matsuda, K, "A surface-emitting laser array with backside guiding holes for passive alignment to parallel optical fibers", IEEE Photonics Technology letters vol. 8 No. 4, (1996) pp. 494-495.*

(Continued)

*Primary Examiner* — Charlie Peng
(74) *Attorney, Agent, or Firm* — Rodney J. Fuller; Booth Udall Fuller, PLC

(57) ABSTRACT

A system for coupling light into a fiber in accordance with embodiments of the present invention include a first fiber, a second fiber which is a double clad fiber, and a bulk optic component positioned between the first and second fibers. At least one mode stripper is positioned between the first fiber entry port and the second fiber exit port providing for limiting and removal of propagating clad light.

19 Claims, 24 Drawing Sheets

(56) References Cited

U.S. PATENT DOCUMENTS

| | | | |
|---|---|---|---|
| 2004/0202218 A1* | 10/2004 | Thornton | 372/50 |
| 2005/0030540 A1* | 2/2005 | Thornton | 356/432 |
| 2005/0117860 A1 | 6/2005 | Vienne | |
| 2006/0133731 A1 | 6/2006 | Sintov | |
| 2007/0206177 A1 | 9/2007 | Anschel et al. | 356/28 |
| 2008/0267228 A1 | 10/2008 | Sacks et al. | 372/6 |

OTHER PUBLICATIONS

Cheung et al., "High Power Optical Parametric Oscillator Source", *IEEE* 3,55-59 (Mar. 18, 2000).

Coleman et al., "Pump Induced Thermal Effects in High Power $Tm^{3+}$ and $Tm^{3+}/Ho^{3+}$ cladding-Pumped Fibre Lasers", *Meas. Sci. Technol.*, 14(7):998-1002 (Jul. 1, 2003).

Frith et al., "High Power 2 μm $Tm^{3+}$-doped Fibre Lasers", *Proc. of SPIE*, 5620(1):36-45 (Dec. 23, 2004).

Hayward et al., "Efficient Cladding-Pumped Tm-doped Silica Fibre Laser with High Power Singlemode Output at 2 μm", *Electronics Letters*, 36(8):711-712 (Apr. 13, 2000).

Jackson et al., "High-Power Diode-Cladding-Pumped Tm-doped Silica Fiber Laser", *Optics Letters*, 23(18):1462-1464 (Sep. 15, 1998).

Jackson et al., "High-power Diode-cladding-pumped $Tm^{3+}$, $Ho^{3+}$-doped Silica Fibre Laser", *Appl. Physc. B.*, 77(5):489-491 (Oct. 2003).

Jackson, S., "Power Scaling Method for 2-μm diode-cladding-pumped $Tm^{3+}$-doped silica fiber lasers that uses $Yb^{3+}$ codoping", *Optics Letters*, 28(22):2192-2194 (Nov. 15, 2003).

Kurkov et al., "Moderate-Power cw Fibre Lasers", *Quantum Electronics*, 34(10):881-900 (Oct. 2004).

International Search Report for PCT/IL2006/001090, 7 pages, dated Jul. 16, 2007.

Written Opinion for PCT/IL2006/001090, 13 pages, dated Jul. 16, 2007.

Beckman et al., "Development of a Mid-Infrared Laser for Study of Infrared Countermeasures Techniques", Spie 2004;5615:27-38.

T. Clausnitzer et al.: "Highly efficient dielectric gratings for high power ultrafast fiber laser systems", SPIE, PO Box 10 Bellingham WA 98227-0010 USA, Jan. 27, 2005, XP040200106.

D. Coleman. et al., "Pump induced thermal effects in high power Tm3+ and Tm3+/Ho3+ claddinpumped fibre lasers". Measurement Science and Technology 2003;14(7):998-1002.

Eriksson et al., Tuneable Lasers for Countermeasures: A Literature Survey. Swedish Defence Research Agency. Scientific report, Dec. 2002.

\* cited by examiner

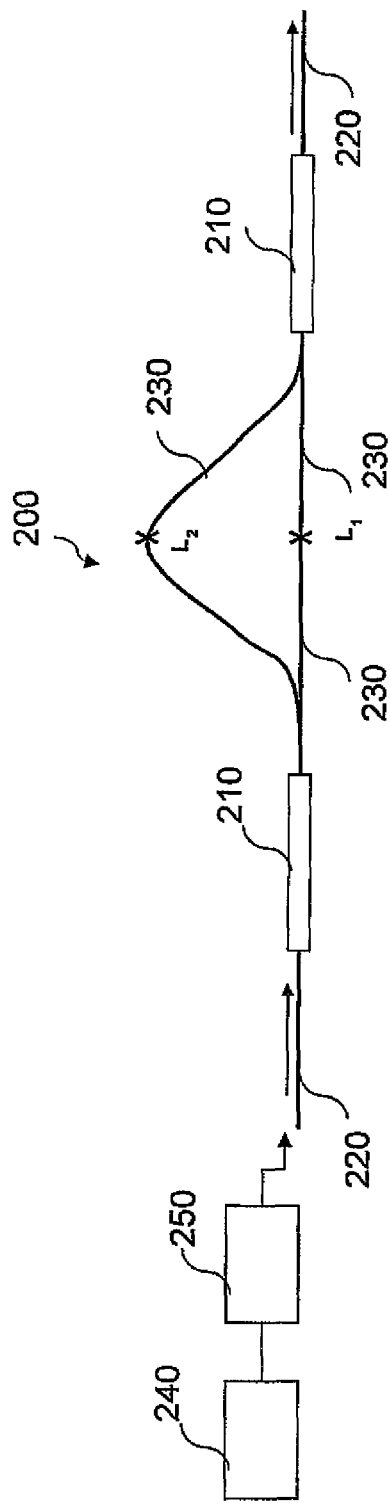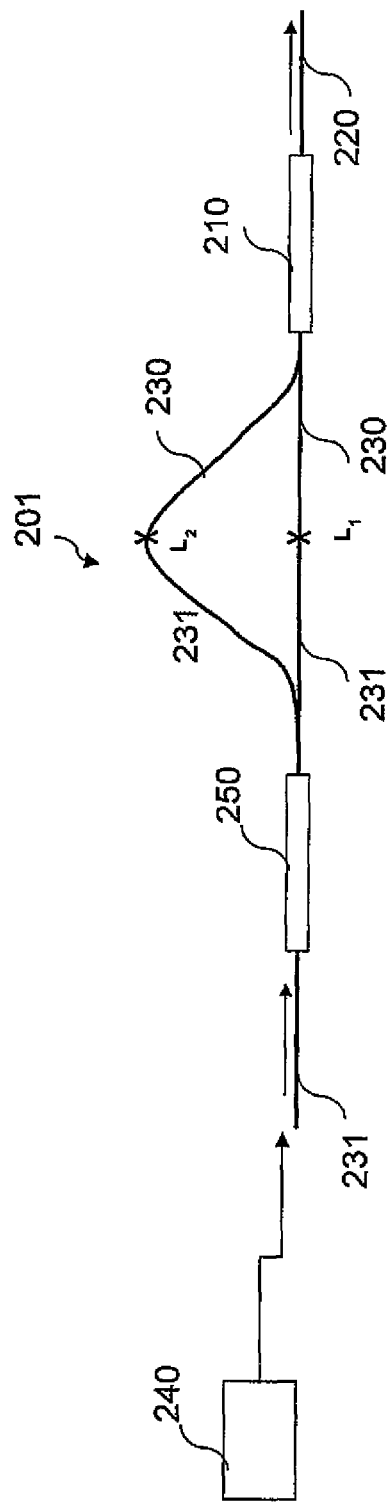

FIBER LASERS

RELATED APPLICATION DATA

This application is a Divisional of U.S. patent application Ser. No. 12/061,594 filed on Apr. 2, 2008, which is a Continuation-In-Part (CIP) application to U.S. patent application Ser. No. 12/088,987 filed on Apr. 2, 2008, which is the U.S. National Stage of PCT/IL2006/001090 filed on Aug. 18, 2006, which is based on and claims the benefit of Israeli Application No. 171251 filed on Oct. 2, 2005, the content of each of which is expressly incorporated herein in its entirety by reference hereto.

FIELD OF THE INVENTION

The present invention relates to fiber laser devices, systems and methods, more particularly, to fiber laser devices, systems and methods for producing Band I and Band IV wavelengths.

BACKGROUND OF THE INVENTION

Lasers for use in the Band I range of wavelengths are suitable for many applications such as remote sensing, laser radar, directed infrared countermeasures, and others. Typically, lasers which are capable of working in the Band I range are bulk lasers made from crystals. It would be advantageous to have Band I laser capability using fiber lasers instead of bulk lasers, as fiber lasers are known to be easier to manufacture, more efficient, more stable, more robust, and have a stable and well defined output beam. However, such fiber lasers have been thought to be highly inefficient or impossible to lase at the required wavelengths due to low gain, reabsorption by the active ion, or absorption of the host material.

Furthermore, lasers for use in the Band IV range of wavelengths are useful for many applications as well. For example, Direct IR Countermeasures (DIRCM) are systems that activate a directional jamming means against an incoming missile. An example of a DIRCM system is described in greater detail in WO 2004/109323, incorporated by reference herein in its entirety.

An ideal source for producing Band IV energy for DIRCM or other applications would be a fiber laser having a large pulse energy. However, fiber lasers with high powers (kW CW) and moderate (mJ) pulse energies (such as, for example, double clad fiber lasers) at Band IV wavelengths do not exist or are not practical for engineering. Specifically, Band IV is generated by converting an available wavelength. For example, an optical parametric oscillator (OPO) based on periodically poled lithium niobate (PPLN) can convert the output wavelength of a Yb fiber laser from 1 μm to 4 μm with an efficiency of about 10%. In order to obtain a 4-5 W output, a 40-50 W laser must be used. However, the characteristics of the fiber (such as a 20/400 Yb fiber) dictate a fiber length of approximately 8 m, which can result in nonlinear effects such as stimulated Brillouin scattering (SBS), stimulated Raman scattering (SRS), and self-phase modulation (SPM) if high energy (mJ level) pulses are generated. Furthermore, the OPO will not be able to handle generation of 4 W at 4 μm, particularly since the PPLN absorbs this wavelength, resulting in high thermal effects and instability. Additionally, frequency conversion generally requires polarized laser sources, which are difficult and costly to assemble using nonstandard polarization maintaining components.

SUMMARY OF THE INVENTION

According to one aspect of the, invention, there is provided a fiber laser for producing Band I wavelengths, including a laser cavity having an optical fiber with an inner clad, an outer clad surrounding the inner clad, and a core surrounded by the inner clad, the inner clad having at least pump power entry point, and the core having a lasing input/output end and a reflecting end, a first reflector positioned at the input/output end, and a second reflector positioned at the reflecting end, the first reflector having 90-100% reflectivity and the second reflector having more than 5% reflectivity in Band I, an energy source (also known as a pump source) for pumping power into the laser cavity via the pump power entry point, and a coupling mechanism for delivering the pump power from the energy source to the laser cavity. More specifically, this invention describes an efficient fiber laser to produce wavelengths longer than 2075 nm. An additional embodiment of this invention includes a mirror for the pump light to cause a second pass of pump light through the active fiber, thereby increasing the overall conversion efficiency and increasing the ability of wavelength selection.

According to another aspect of the invention, there is provided a fiber laser for producing Band IV wavelengths, including a depolarized laser oscillator for producing depolarized light in a first orthogonal state and in a second orthogonal state, at least one amplifier for amplifying the depolarized light, a polarizer for separating the amplified depolarized light into a first orthogonal state and a second orthogonal state, a first frequency conversion device for converting the amplified depolarized light in the first orthogonal state, and a second frequency conversion device for converting the amplified depolarized light in the second orthogonal state.

According to yet another aspect of the present invention, there is provided a fiber laser including an active optical fiber having an inner clad, an outer clad surrounding the inner clad, and a core surrounded by the inner clad, wherein the inner clad has at least one pump power entry point for sending pump energy through the active optical fiber in a first direction, the core having a lasing input/output end and a lasing reflecting end, at least one pumping source for pumping power into the active optical fiber via the pump power entry point, at least one coupling mechanism for delivering the pump power from the pumping source to the active optical fiber, and a loop portion at a second end of the inner clad for sending pump energy through the active optical fiber in a second direction which is opposite to the first direction.

According to yet another aspect of the invention, there is provided a system for coupling light into a fiber. The system includes a first fiber having a first fiber entry port and a first fiber exit port, a second double clad fiber having a second fiber entry port, a second fiber exit port, and a mode stripper positioned between the second fiber entry port and the second fiber exit port, and a bulk optic component positioned in between the first fiber exit port and the second fiber entry port.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 3A and 3B are schematic illustrations of depolarizers, in accordance with embodiments of the present invention;

DESCRIPTION OF THE PREFERRED EMBODIMENTS

Figure 1:
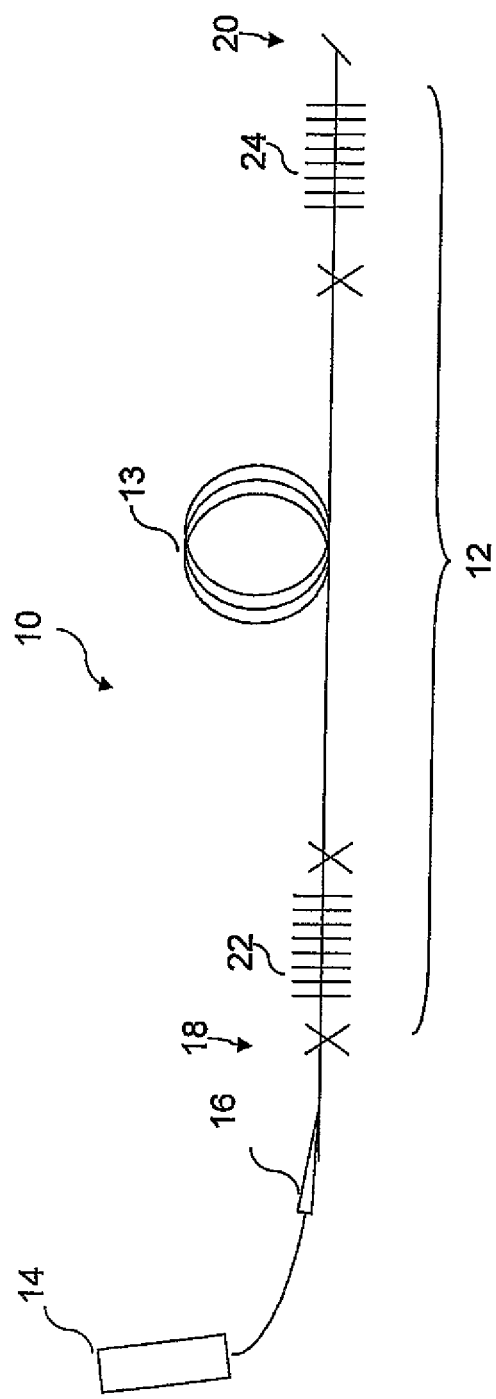
FIG. 1 is a schematic illustration of a fiber laser for use in the Band I range in accordance with one embodiment of the present invention.

The present invention is of fiber lasers for various applications. Specifically, the present invention is of a continuous wave or pulsed fiber laser which can be used to generate radiation in the 2.08-2.3 µm band, and of a high power and/or pulsed depolarized fiber laser which can be used to generate radiation in the Band IV range.

The principles and operation of fiber lasers according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Continuous Wave Fiber Laser in the 2.08-2.3 µm Band

The lasing wavelength depends on the doping concentration, mirror reflectivities, background fiber absorption, and fiber length.

The gain in a fiber laser is given in Eq. 1, $$g_{tot} = \int_0^L g(z, \lambda) dz = \int_0^L [N_2(z)\sigma_s^e(\lambda) - N_1(z)\sigma_s^a(\lambda)] dz \qquad \text{Eq. 1}$$

where $g_{tot}$ is the total gain in the fiber, $g(z,\lambda)$ is the gain at position z and wavelength $\lambda$, L is the length of the fiber, $N_2$ is the population of the upper lasing level, $N_1$ is the population of the lower lasing level, and $\sigma^e$ and $\sigma^a$ are the emission and absorption cross-sections at the lasing wavelengths. It should be noted that $\sigma$ terms implicitly include the overlap integral of the lasing mode and the core of the fiber, $\Gamma$, i.e., $$\sigma = \Gamma\sigma(\text{ion})$$

where $\sigma$ is se or $\sigma_a$ of Eq. 1, $\sigma(\text{ion})$ is the cross-section of the lasing material (typically an ion), and $\Gamma$ is the overlap integral. Eq. 1 can be converted to an algebraic form by using Eqs. 2 and 3 to remove the integral.

$$N_{tot} = N_1 + N_2 \qquad \text{Eq. 2}$$

$$n_{ave} = \frac{1}{L}\int_0^L \frac{N_2(z)}{N_{tot}} dz \qquad \text{Eq. 3}$$

After making this substitution, Eq. 4 shows the total gain is a function of the average inversion and the fiber cross-sections.

$$g_{tot} = N_{tot} \cdot L \cdot [n_{ave}(\sigma_s^e(\lambda) + \sigma_s^a(\lambda)) - \sigma_s^a(\lambda)] \qquad \text{Eq. 4}$$

It can be immediately seen that the fiber gain is heavily dependant upon the absorption cross-section in the last term of Eq. 4. The inversion only gives rise to the component scaled by $n_{ave}$, which may be typically less than a few percent. The gain spectrum can be changed thus by increasing the dopant concentration or increasing the fiber length.

The lasing wavelength can now be determined using Eq. 4 for the gain of the fiber. The laser will operate when the round trip gain is equal to the loss as shown in Eq. 5.

$$R_1 R_2 \exp\left\{2 \cdot \int_0^L g(\lambda, z) dz - 2\alpha L\right\} = 1 \qquad \text{Eq. 5}$$

Here, $R_1$ and $R_2$ are the reflectivities of the cavity mirrors, and $\alpha$ is the background length dependent loss in the cavity. After substituting Eq. 1 and 4 into Eq. 5, we arrive at Eq. 6.

$$n_{ave} = \frac{1}{N_{tot}} \cdot \frac{1}{\sigma_s^e + \sigma_s^a} \cdot \left[\alpha - \frac{1}{2L}\ln(R_1 R_2) + \sigma_s^a N_{tot}\right] \qquad \text{Eq. 6}$$

This equation gives the average inversion in the laser as a function of wavelength, mirror reflectivities, background fiber loss, and dopant concentration. The wavelength that lases is the wavelength in which $n_{ave}$ is minimized, since this is the first wavelength to reach threshold.

To explain Eq. 6, the lasing wavelength is determined by how many atoms (or other lasing element such as molecules, etc.) a photon sees. Each atom will cause absorption and cause the spectrum to shift. For example, in Yb:silica fibers for wavelengths longer than 1040 nm, the slope of the gain is much higher than the slope of the loss. The continuous wave inversion will remain approximately the same no matter how hard the laser is pumped in CW operation. Inversion is relatively constant. However, the loss term can be altered dramatically to shift the lasing wavelength to longer wavelengths. If the doping concentration is increased, or the cavity lifetime is increased by increasing mirror reflectivities, or the intrinsic fiber loss is increased, the spectrum will shift to longer wavelengths. In this invention, a double clad fiber allows for a high enough doping concentration to obtain long wavelengths. It will also be appreciated by those in the art, that the fiber may also have multiple claddings, such as triple clad fiber, or other variations, such as raised index core to allow for single mode operation using coiling.

Thus, to make the wavelength longer, the fiber length can be increased. The length cannot be increased without limit. For efficient operation, the entire fiber must be inverted so that the lasing signal is not reabsorbed by the noninverted fiber section. This reabsorption is also believed to cause the laser signal to pulse, and true CW lasing will never be achieved.

Reference is now made to FIG. 1, which is a schematic illustration of a fiber laser 10 in accordance with one embodiment of the present invention. Fiber laser 10 has three major components: a laser cavity 12, an energy source 14 and a coupling mechanism 16.

Laser cavity 12 includes an active optical fiber 13 and two fiber Bragg gratings (FBG) 22 and 24, generally in nonactive fibers, that serve as the cavity high reflector and output coupler, respectively. The laser light emerges from the output point 20, which can be an angle cleaved connector. Pump power entry point may be at either end of optical fiber 13 or at any point along optical fiber 13, which includes the active fiber, the fiber containing the FBGs 22 and 24, or an additional fiber optically connected to optical fiber 13. Multiple pump power entry points may also be selected. It should be understood by those skilled in the art that in a double clad laser, such entry points are designed to pump power into an outer clad, wherein lasing input/output end 18 is present in an inner clad and reflecting end 20 is only present in a core defined by the inner core. A first reflector 22 is positioned at input/output end 18, and a second reflector 24 is positioned at reflecting end 20. In a preferred embodiment, optical fiber 13 is a Tm:silica fiber, as is commonly known in the art. More specifically, optical fiber 13 may be a double clad Tm:silica fiber. In alternative embodiments, optical fiber 13 is any double clad fiber such as, for example, Tm:silica, Ho:silica; Yb, Ho:silica; Er,Yb, Tm:silica; Er, Tm:silica;Yb, Tm:silica; Tm, Ho:silica; Er, Yb, Ho:silica; Tm:ZBLAN, Ho:ZBLAN; Yb, Ho:ZBLAN; Er, Yb, Tm:ZBLAN; Er, Tm:ZBLAN; Yb, Tm:ZBLAN; Tm, Ho:ZBLAN; Er,Yb, Ho:ZBLAN; Tm:fluouride, Ho:fluouride;Yb, Ho:fluouride; Er,Yb, Tm:fluouride; Er, Tm:fluouride; Yb, Tm:fluouride; Tm, Ho:fluouride; Er, Yb, Ho:fluouride; Tm:chalcogenide; Ho:chalcogenide; Nd:chalcogenide; Er:chalcogenide; Yb, Ho:chalcogenide; Yb, Tm:chalcogenide; Tm, Ho:chalcogenide; or Yb, Ho:chalcogenide; Pr:chalcogenide; Dy:chalcogenide; Tb:chalcogenide and the like.

In a preferred embodiment, optical fiber 13 is a double clad fiber. Double clad fibers have been shown to produce high average powers and are commonly known in the art. In an alternative embodiment, optical fiber 13 is a single clad fiber. In some embodiments, combinations of single clad and double clad fibers may be used. For example, a single clad Tm:silica fiber can be core pumped with Er:Yb:silica fiber lasers (such as 1.57 um Er:Yb:silica fiber lasers).

In accordance with a preferred embodiment of the present invention, first reflector 22 is a double clad Fiber Bragg Grating (FBG). For example, a FBG of 2.1 micrometer wavelength performance having 90-100% reflectivity can be used. Second reflector 24 is also a double clad or single clad FBG of 2.1 micrometers having a reflectivity of higher than 5%. In preferred embodiments, second reflector 24 has a reflectivity of about 10-35%. In one embodiment, one or both of first and second reflectors 22 and 24 are double clad FBGs which are chirped so as to enable random lasing within a relatively wide spectral band. In one embodiment, optical fiber 13 has a core diameter of around 10 um and clad size in a range of 80-400 μm, and more preferably in a range of 80-250 μm, and yet more preferably in a range of 100-150 μm. In a preferred embodiment, optical fiber 13 has a clad size of about 125 μm. Cavity characteristics in preferred embodiments are listed in Table 1 below:

TABLE 1

| fiber | Value |
| --- | --- |
| Output coupler Reflectivity | 5-40% |
| High reflector | 90-100% |
| Length (m) | 0.5-8 m |

In a preferred embodiment, energy source 14 is a multi-mode high numerical aperture (0.22-0.46) fiber coupled-pump diode source, which pumps out 790 nm CW light. Such diode sources are commonly known in the art and may include, for example, the F2 Series diodes from Coherent, Inc. (Santa Clara, Calif., USA). In alternative embodiments, energy source 14 can be other single emitter diodes, fiber coupled diode stacks, arrays of fiber coupled diodes, diodes with free space coupling to the active fiber, and any other suitable source. In some embodiments, multiple energy sources are used.

Coupling mechanism 16 is any suitable mechanism for coupling the energy source 14 to the fiber laser. In one embodiment, coupling mechanism 16 is a direct coupling, obtained by splicing energy source 14, for example laser diode, to the fiber laser. In another embodiment, coupling mechanism 16 is a tapered fiber bundle (for example, from Sifam Fibre Optics, UK). In yet other embodiments, coupling mechanism 16 may include a connector, a free space coupler, GT wave technology (SPI Inc.), a prism or a groove in the fiber, or any other suitable mechanism. In some embodiments, multiple coupling mechanisms are used.

In order to produce a high wavelength output, several parameters must be optimized. These parameters include, for example, ion concentrations, mirror reflectivities and fiber length. In some embodiments, ion concentrations are in a range of 300 parts per million (ppm)-35000 ppm, and may be in a range of 8000 ppm-27000 ppm and or may be in a range of 12000 ppm-22000. Doping concentration should be high enough to support the lasing wavelength in a length of fiber that can be inverted by the pump. The effective amount of doping is at least an order of magnitude higher than the effective amount of ion doping in commercially available fiber laser systems such as, for example, the TLR series (IPG Photonics, Oxford, Mass., USA). Effective amounts of ion doping in such systems may be, for example, concentrations of 200 ppm, which has been shown to yield about 1 dB/m absorption of 1560 nm light in the core. Furthermore, it is important to increase the cavity lifetime of a photon. As such, output mirror reflectivity should be greater than 5%, and more preferably greater than 30%. The output coupler is selected in order to achieve efficient lasing while preventing feedback from external sources. In embodiments of the present invention, the fiber is configured to absorb 30-90% of the pump power, with other possible ranges including absorptions of 40-90% and 60-90% of the pump power. Fiber length is configured to be shorter than the inversion length for true CW operation. In some embodiments, fiber length varies from 0.5-12 m in length, or from 1-8 m in length and in some embodiments from 2-5 m in length.

Figure 19:
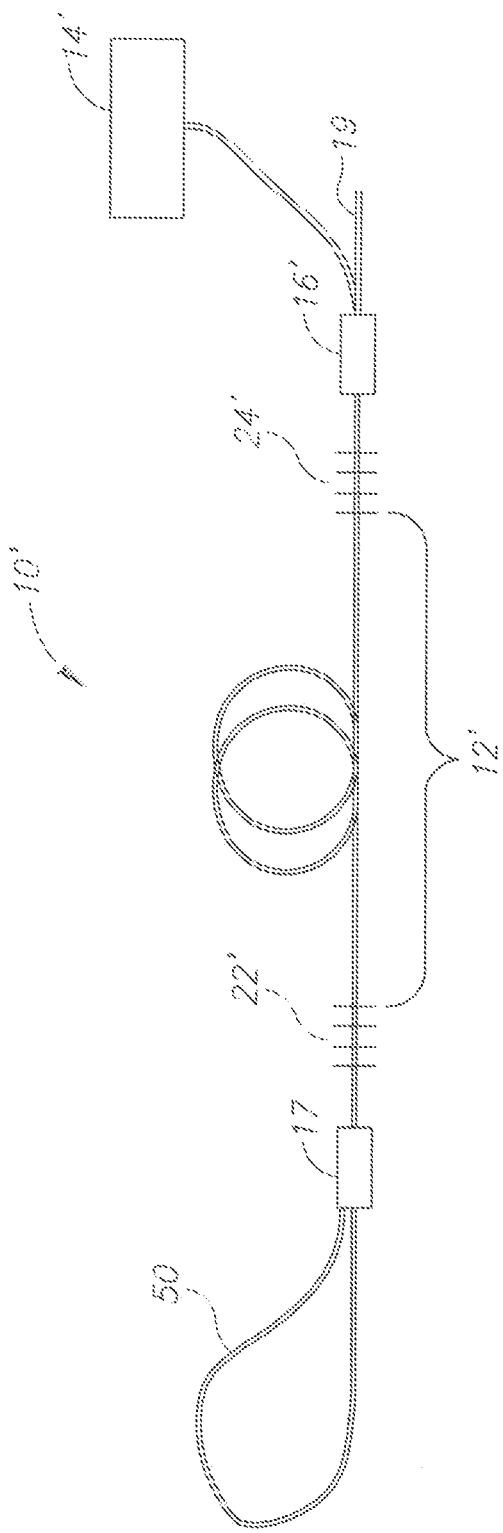
FIG. 19A is a schematic illustration of a fiber laser for use in the Band I range in accordance with an additional embodiment of the present invention.
FIGS. 19B and 19C are schematic illustrations showing the paths of the pump energy and the laser signal, respectively, in accordance with the embodiment shown in FIG. 19A.

Efficiency can be further improved if the pump energy can be configured to be sent back through the active fiber for a second pass. Reference is now made to FIG. 19A, which is a schematic illustration of a fiber laser 10' in accordance with another embodiment of the present invention. Fiber laser 10' includes a laser cavity 12', a pumping source 14' and a coupling mechanism 16' as shown with respect to fiber laser 10 in FIG. 1. However, fiber laser 10' further includes a pump reflector 50 at an end which is opposite an output end 19 of the fiber. Furthermore, in some embodiments, pumping source 14' is placed at output end 19, so that pump energy can be reflected through fiber 10' and sent through fiber 10' for a second time before exiting at output end 19. Pump reflector 50 may be, for example, a loop mirror, such as the one shown in FIG. 19.

For a loop mirror such as shown in FIG. 19, a pump combiner 17, which in this case is a 2 to 1 multimode combiner, is positioned after the cavity high reflective FBG 22' and is used to connect fiber 10' in a loop-like fashion back to itself. This allows pump energy to undergo an additional pass in the opposite direction and exit through output end 19. For optimal retention of transmission in this opposite direction, pump combiner 17 is a side coupler, such as ones described in U.S. Pat. No. 5,999,673 and US Patent Application Publication Number 2006/0133731 A1, incorporated by reference herein in their entireties. Such side couplers include a pump guiding fiber having a fiber cladding, a fiber core and an attachment section, wherein the attachment section has a straight core section and a tapered core section, and a receiving fiber having an inner clad to which the attachment section is attached. In some embodiments, pump combiner 17 and coupling mechanism 16' are both side couplers. Typical transmission of the loop mirror is expected to be greater than 80% for the pump. In other embodiments, the fibers of the coupler are not double clad since the lasing signal, if any still exists after the high reflector FBG 22', does not need to redirected back into the fiber. A multimode fiber with the same dimensions of the first clad of the double clad fiber may be used.

The path of the pump is shown in FIG. 19B, wherein the pump energy is transmitted via pumping source 14', which may be, for example, pump diodes. Pump energy passes through fiber 10' into and around pump reflector 50, and back through fiber 10'. The path of the laser signal is shown in FIG. 19C, wherein the laser signal is contained within laser cavity 12', and reflected by reflectors 22' and 24'.

In one embodiment, a commercially available Tm silica fiber is used. It is pumped with 10 W of 790 nm light. The lasing wavelength is 2097 nm, which is the natural lasing wavelength of Ho:YAG. Parameters are chosen as described above to produce a laser with at least 1-2 W of output power.

Depolarized Fiber Laser for High Pulse Energy in Band IV

For the purposes of the present application, the following terms are defined as follows:

"Polarization" is defined as the direction of the electrical field within a beam of light.

"Polarized light" is defined as light in which the state of polarization changes slowly enough to measure the direction of the light wave. The direction is not necessarily fixed in time.

"Depolarized light" is defined as light in which the state of polarization changes so fast that it is considered to have two directions of polarization at all times.

Figure 2:
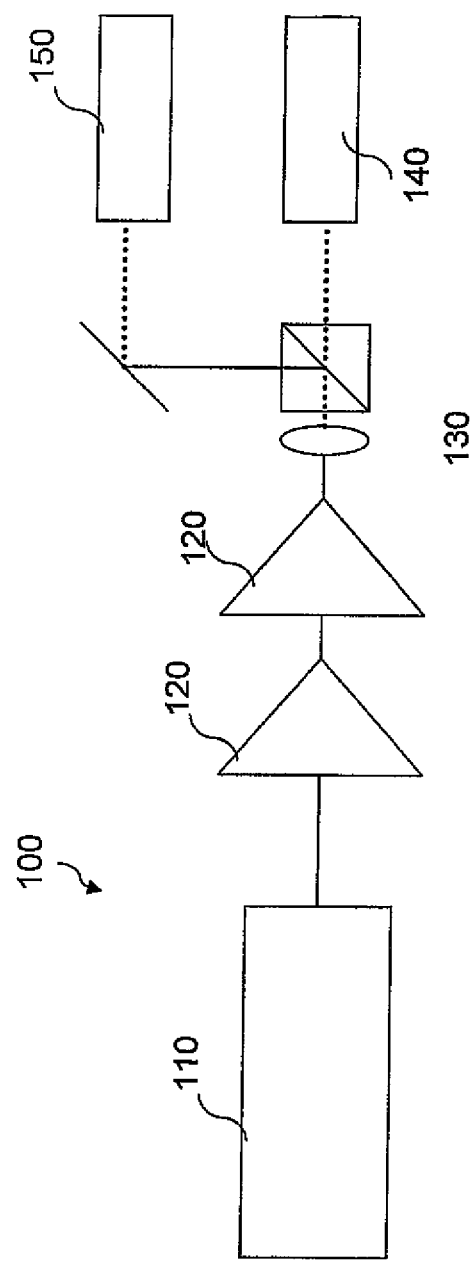
FIG. 2 is an illustration of a setup of a fiber laser system which is designed to overcome the limitations involved in producing a high energy fiber laser in Band IV.

Reference is now made to FIG. 2, which is an illustration of a setup of a fiber laser system 100 which is designed to overcome the limitations involved in producing a high energy fiber laser in the band IV range. System 100 includes a depolarized laser oscillator 110, at least one amplifier 120, a polarizer 130, a first frequency conversion device 140 and a second frequency conversion device 150. Depolarized laser oscillator 110 can be a typical fiber laser which is naturally significantly depolarized, a combination of two polarized laser sources, or a laser diode which has been depolarized, in accordance with methods which are described more fully hereinbelow. In a naturally depolarized fiber laser, the bandwidth can be extremely narrow and external modulation allows for the generation of pulses that is useful for frequency conversion. In a laser diode that has been depolarized, options exist for changing pulse duration and repetition rate of the laser system. The output of depolarized oscillator 110 is amplified by one or more optical amplifiers 120. Optical amplifiers 120 may be multiple amplifiers, wherein each of the amplifiers may be the same type or different types of amplifiers. The depolarized output from optical amplifier(s) 120 is collimated, and sent through polarizer 130. In some embodiments, polarizer 130 is a thin film polarizer (for example, catalog number 11B00HP.6 from Newport Corporation, Irvine, Calif., USA). In other embodiments, polarizer 130 is a polarizing cube (for example, catalog number 05BC15PH.9, Newport Corporation). Approximately half the power will appear in each polarization state: the P-state and the S-state. The P-state polarized light then propagates through polarizer 130 to first frequency conversion device 140, while the S-state polarized light propagates through polarizer 130 to second frequency conversion device 150. First and second frequency conversion device 140 and 150 are, for example, a ZGP OPO to be used with a Tm:silica fiber laser, or a PPLN OPO to be used with a Yb:silica fiber laser, or any other suitable OPO depolarized source configuration. Some other examples include OP-GaAS OPO or OPO/OPG, a PPMgO:LN OPO; a PPSLT (Periodically Poled Stoichiometric Lithium Tantalite) OPO or OPG/OPA; and an OPG/OPA.

The outputs of the OPOs then may be recombined using a polarizer to obtain a collinear source. In alternative embodiments other frequency conversion devices can be used, such as an OPG/OPA configuration or any combination. Thus, thermal and other high power effects are reduced, allowing more pulse energy to be provided to each frequency conversion device. The setup described herein also allows for stable splitting of the power between first and second frequency conversion devices 140 and 150. The output of the two frequency conversion devices may optionally be recombined into one beam.

Several options exist for a depolarized oscillator. One option is a laser diode, since the pulse duration, repetition rate, peak power, and pulse duration can be easily selected. However, laser diodes are generally polarized, as dictated by the device physics. Since a depolarized laser diode oscillator is not commercially available, the diode must be depolarized.

Depolarization of the laser is accomplished as follows:
A polarized source can be depolarized by splitting the power equally. The two halves are then recombined as two orthogonal polarizations after experiencing a relative delay, $\Delta L = L_2 - L_1$, longer than the coherence length, $L_c$ of the source, that is $$\Delta L > L_c.$$

The coherence length is approximately related to the spectral bandwidth of the source. The relation can be derived as follows. The coherence time, $\Delta \tau_c$, is related to the spectral width, $\Delta v$, approximately as follows.

$$\Delta \tau_c \sim \frac{1}{\Delta v}$$

Distance is equal to speed multiplied by time, $$L_c = c \Delta \tau_c$$

where c is the speed of light in the material. The spectral width can be measured, for example, with an optical spectrum analyzer, in terms of wavelength, $\Delta \lambda$, and then converted to frequency, $\Delta v$, using the following relation.

$$c = v\lambda \Rightarrow \Delta v = \frac{c}{\lambda^2} \Delta \lambda$$

The spectral width can then be converted to a coherence time, and then a coherence length. The above three equations can be combined to yield $$L_c = \frac{\lambda^2}{n \Delta \lambda} \qquad \text{Eq. 7}$$

Here, the effective index of the propagating mode in the fiber, n, has been included to account for the convention that all wavelengths are measured in free space, but distance is measured inside of the fiber. The path difference must be selected so that it is longer than the coherence length of the source.

Reference is now made to FIG. 3A, which is a schematic illustration of a depolarizer 200, in accordance with one embodiment of the present invention. Depolarizer 200 is constructed from two polarization beam splitters (PBS) 210. A PBS is available, for example, from AFR, catalog number PBS-06-P-N-B-1-Q. Each PBS includes a non-polarization maintaining (PM) fiber 220 and two PM fibers 230. In the embodiment shown and described herein, non-PM fiber 220 is a Flexcore 1060, and PM fiber 230 is a Fujikura 980 Panda fiber. PM fibers 230 of both PBSs 210 are spliced together, forming two paths: $L_1$ and $L_2$. Path $L_1$ is slow relative to path $L_2$, since light polarized along path $L_1$ is along the axis of non-PM fiber 220 while light polarized along path $L_2$ is orthogonal to the axis of non-PM fiber 220. In one embodiment, the difference in lengths between the two paths is approximately 15 cm. Insertion loss for each of the splitters for the depolarizer depicted in FIG. 3A is 0.67/0.80 dB and 0.50/0.58 dB. Non-PM fiber 220 receives signals from a signal diode 240. In a preferred embodiment, a polarization controller 250 is placed between signal diode 240 and depolarizer 200 to ensure an equal power split into both arms. A polarization controller is available, for example, from General Photonics, CA, USA (catalog number PCD-M02).

Reference is now made to FIG. 3B, which is a schematic illustration of a depolarizer 201, in accordance with another embodiment of the present invention. In this embodiment, a signal diode 241 coupled to a polarization maintaining fiber is used such that the light is polarized along a known direction, typically the slow axis. For this reason, the polarization controller 250 can be removed since a 50:50 splitter can be used to obtain an equal power split. Depolarizer 201 is constructed from a 50:50 polarization maintaining (PM) splitter 260 and a polarization beam splitter (PBS) 210. A PM splitter 260 is available, for example, from Sifam, catalog number FFP-8K3264A10.

Figure 4A:
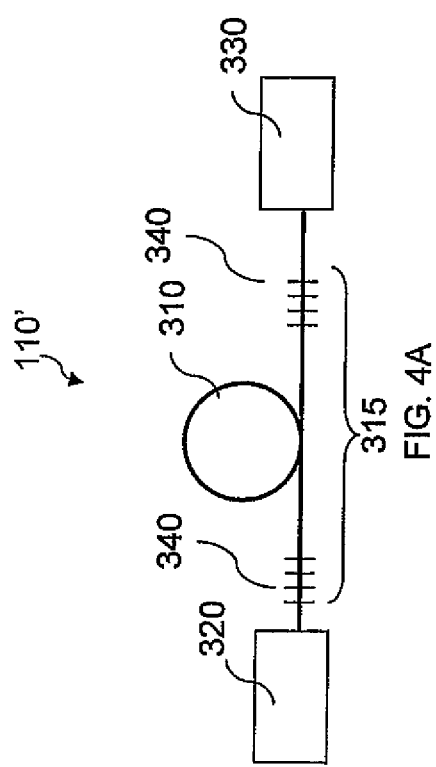
FIGS. 4A and 4B are schematic illustrations of depolarized sources, in accordance with another embodiment of the present invention.

Another option for a depolarized oscillator is a fiber laser with an external modulator. Reference is now made to FIG. 4A, which is a schematic illustration of a depolarized pulsed oscillator 110' in accordance with another embodiment of the present invention. A fiber laser 315 built with non-polarization maintaining components is generally depolarized. If a polarizing cube is placed after the fiber, there is typically a 50%/50%+/−10% split in the output power between the polarization states. As shown in FIG. 4A, a pump diode 320 pumps the fiber laser 315, which is made with non-polarization maintaining components, namely two FBGs 340 and an active fiber 310. An external modulator 330 placed after the fiber laser causes fiber laser 315 to obtain pulses and thus act as a depolarized pulsed oscillator 110' for use in fiber laser system 100 for producing a high energy fiber laser in the Band IV range.

Figure 4B:
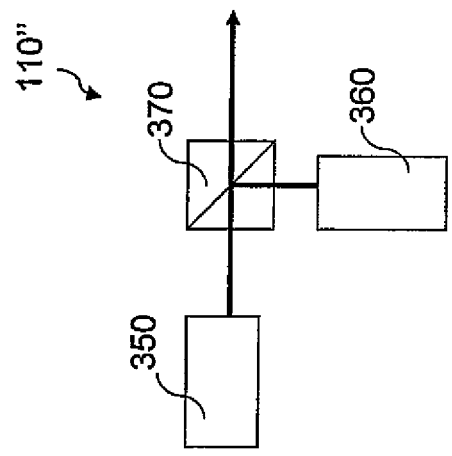

Reference is now made to FIG. 4B, which is a schematic illustration of a depolarized oscillator 110" in accordance with another embodiment of the present invention. A first polarized laser 350 and a second polarized laser 360 are provided, wherein first and second polarized lasers 350 and 360 have no temporal coherence between them. First and second polarized lasers 350 and 360 are combined using a polarizing cube 370, resulting in a depolarized source.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

Example 1

Experiment: Long Wavelength Output Using Tm:Silica Fiber Laser

In the following examples, a 20/200 Tm doped double clad silica fiber with the specifications listed in Table 2 was used.

TABLE 2

| fiber | value |
| --- | --- |
| Core size (μm) | 20 |
| Core NA | 0.11 |
| Clad size (μm) | 200 |
| Clad NA | 0.46 |
| Dopant conc. $10^{26}$ atoms/m$^3$ | 0.5 |
| Fiber length | 5 |
| Clad shape | octagon |

The laser performances of a given cavity with specified surface reflections were simulated at specific signal and pump wavelengths. The simulation tool which was used has the ability to predict both laser wavelength and efficiency curve, for both spectrally flat mirrors and for bulk grating (BG) mirrors.

Setup I.

Figure 5:
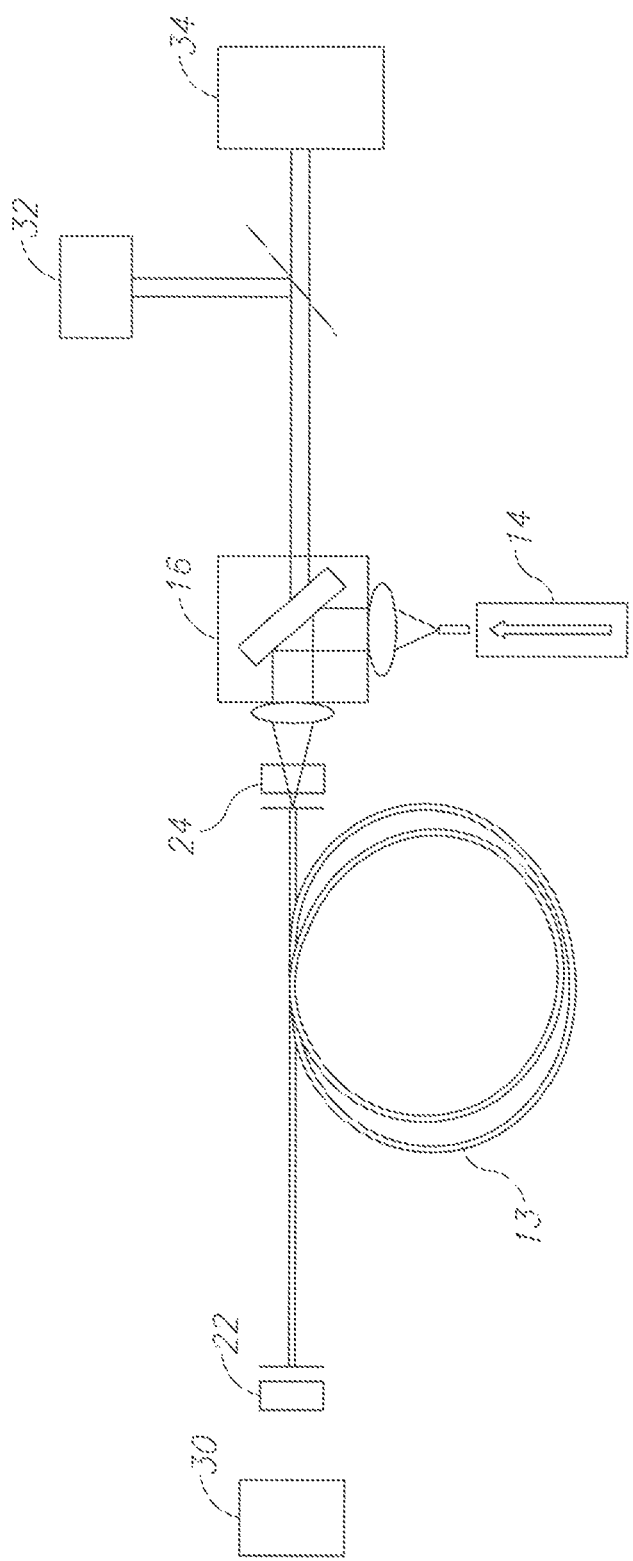
FIG. 5 is an illustration of a first setup of a fiber laser which was tested.

Reference is now made to FIG. 5, which is an illustration of a first setup of a fiber laser which was tested. Energy source 14 was a diode pump working at wavelength of approximately 790 nm. Coupling mechanism 16 was a free space beam combiner. First and second reflectors 22 and 24 were butted to flat dichroic mirrors, having characteristics as listed in Table 3.

TABLE 3

| fiber | Parameters |
| --- | --- |
| R1@2000 nm | 35% |
| R2@2000 nm | 80% |
| R2@800 nm | 80% |
| Dopant conc. $10^{26}$ atoms/m$^3$ | 0.5 |

Mirrors were butted to fiber ends with no physical contact so that high pump/laser power could be launched through them without damaging the surface.

As no coating on the free space beam combiner fit both pump and laser wavelengths, AR coated lenses suited for pump light were used.

Results were measured by analyzing laser radiation using a power meter 30, a photodiode 32 or a spectrometer 34. Power meter 30 was an Ophir power meter (FL250A-SH-V1), photodiode 32 was a fast photoconductor—PD-10.6 (Vilgo)—2-12 um 800 MHz detector, and spectrometer 34 was a B&Wtek spectrometer (BTC 500). Spectrum measurement was further accomplished using a CVI CM110 monochromator, integrated with a detector, alignment mechanism, and LabView computer control.

Setup II.

Figure 6:
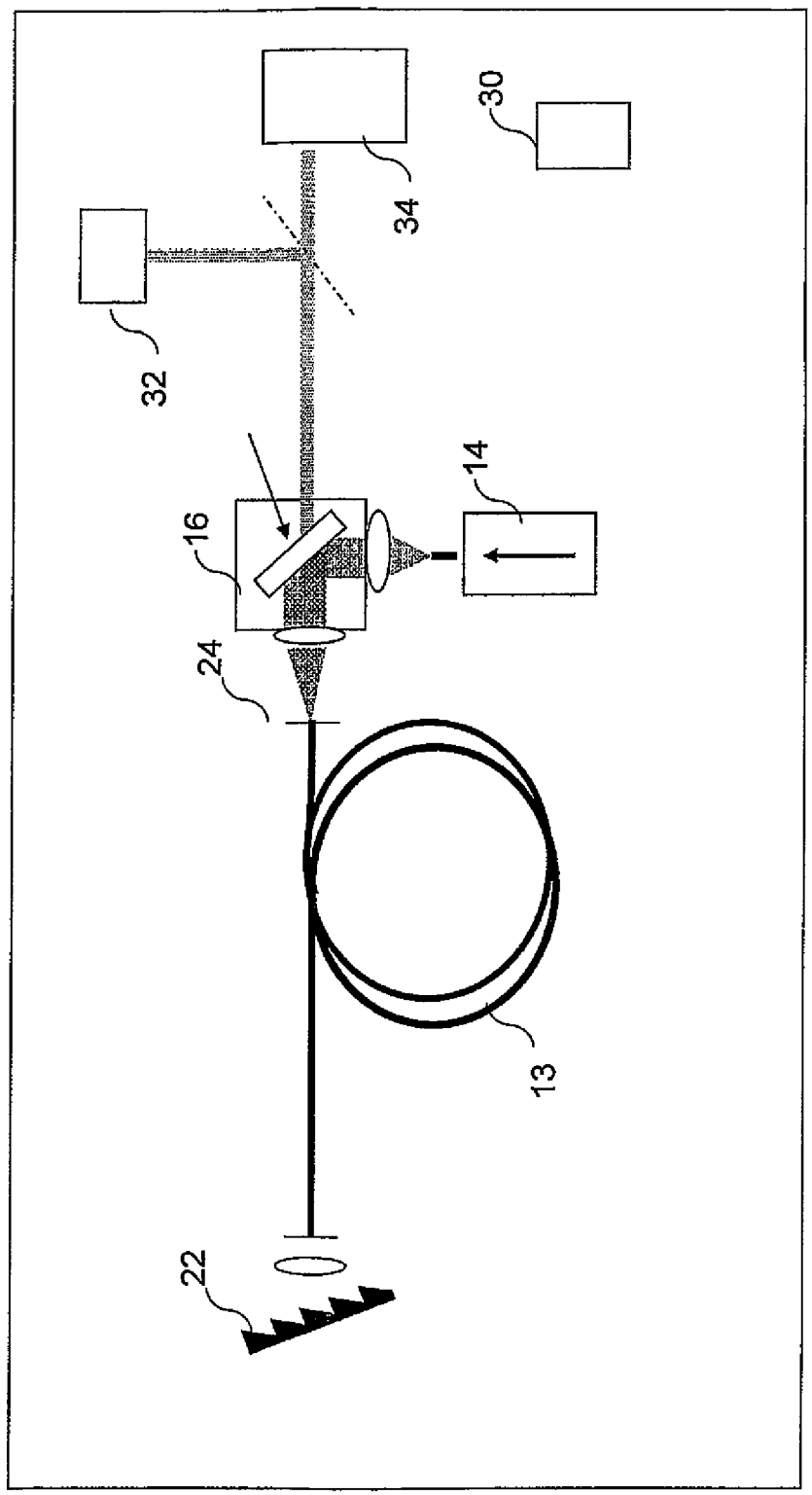
FIG. 6 is an illustration of a second setup of a fiber laser which was tested.

Reference is now made to FIG. 6, which is an illustration of a second setup of a fiber laser which was tested. Energy source 14 was a diode pump working at 790 nm wavelengths. Coupling mechanism 16 was a free space beam combiner. First reflector 22 was a bulk grating, having characteristics as listed in Table 4 (BG R) and the second reflector 24 was the zero degree cleave of the fiber. The reflectivity for the BG listed in the table includes both the reflectivity of the grating and the coupling efficiency of the light back into the fiber. The laser shown in FIG. 6, the bulk grating was designed to selectively reflect light from 1900-2100 nm by rotating it around its axis. Bulk gratings and cleaved ends 24 formed the tunable laser. In addition, a secondary cavity existed denoted in Table 4 (R1 and R2) between the two zero degree cleaved ends of the fiber.

TABLE 4

| fiber | Parameters |
| --- | --- |
| R1@2000 nm | 5% |
| R2@2000 nm | 5% |
| BG R@2000 nm | 30% |

Results were measured by analyzing laser radiation using a power meter 30, a photodiode 32 or a spectrometer 34. Power meter 30 was an Ophir power meter (FL250A-SH-V1), photodiode 32 was a Fast photoconductor—PD-10.6 (Vilgo)—2-12 um 800 MHz detector, and spectrometer 34 was a B&Wtek spectrometer (BTC 500). Spectrum measurement was further accomplished using a CVI CM110 monochromator, integrated with a detector, alignment mechanism, and LabView computer control.

Setup III.

Figure 7:
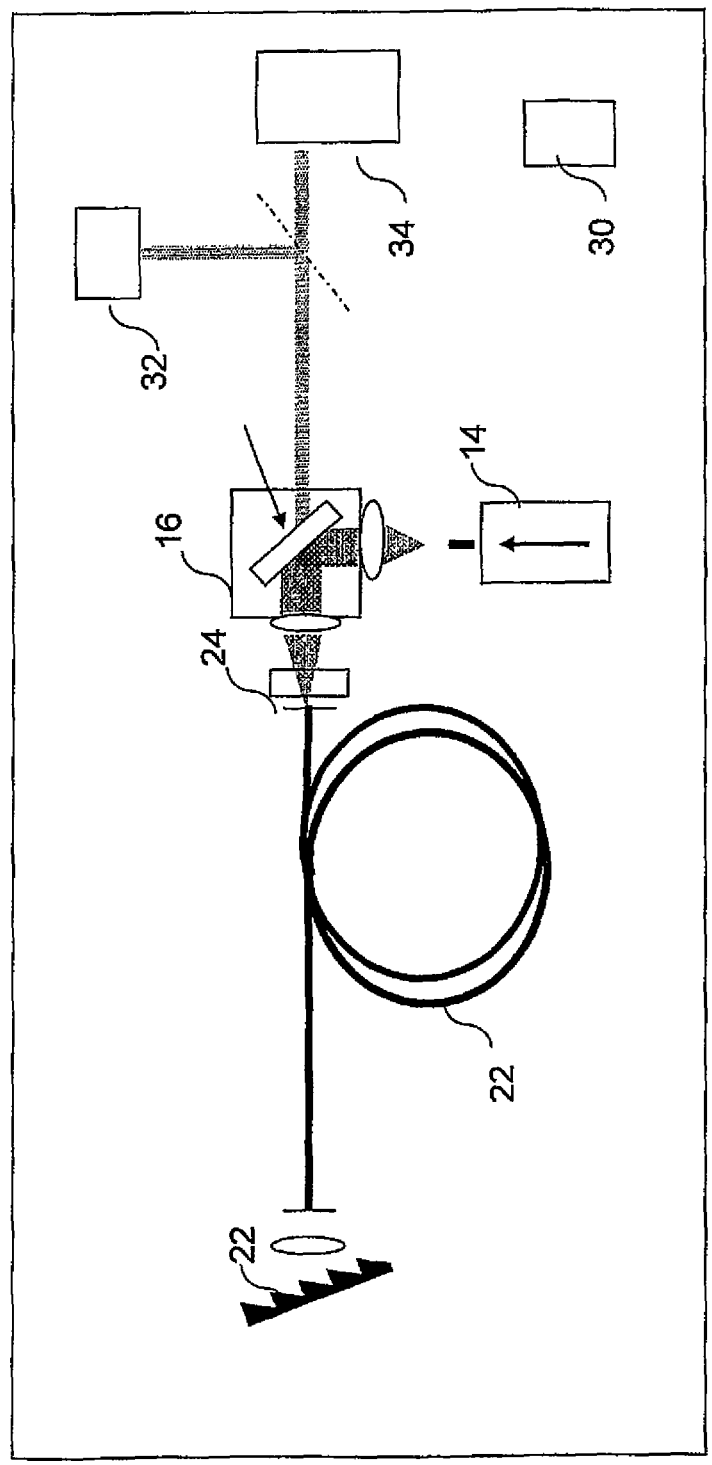
FIG. 7 is an illustration of a third setup of a fiber laser which was tested.

Reference is now made to FIG. 7, which is an illustration of a third setup of a fiber laser which was tested. Energy source 14 was a diode pump working at 790 nm wavelengths. Coupling mechanism 16 was a free space beam combiner. The first reflectors 22 was bulk grating, but in this case, second reflector 24 was a butted dielectric mirror having a high reflectivity of about 30% as listed in Table 5. The difference between this setup (Setup III) and the previous setup (Setup II) is the 30% output coupler on the laser cavity. Equation 6 predicts that efficient lasing at longer wavelengths should be possible by increasing the mirror reflectivities.

TABLE 5

| fiber | Parameters |
| --- | --- |
| R1@2000 nm | 35% |
| R2@2000 nm | 5% |
| BG R@2000 nm | 30% |
| signal attenuation (dB/m) | 0.1 |

Results were measured by analyzing laser radiation using a power meter 30, a photodiode 32 or a spectrometer 34. Power meter 30 was an Ophir power meter (FL250A-SH-V1), photodiode 32 was a Fast photodiode—PD-10.6 (Vilgo)—2-12 um 800 MHz detector, and spectrometer 34 was a B&Wtek spectrometer (BTC 500). Spectrum measurement was further accomplished using a CVI CM110 monochromator, integrated with a detector, alignment mechanism, and LabView computer control.

Results:

Setup I.

Figure 8:
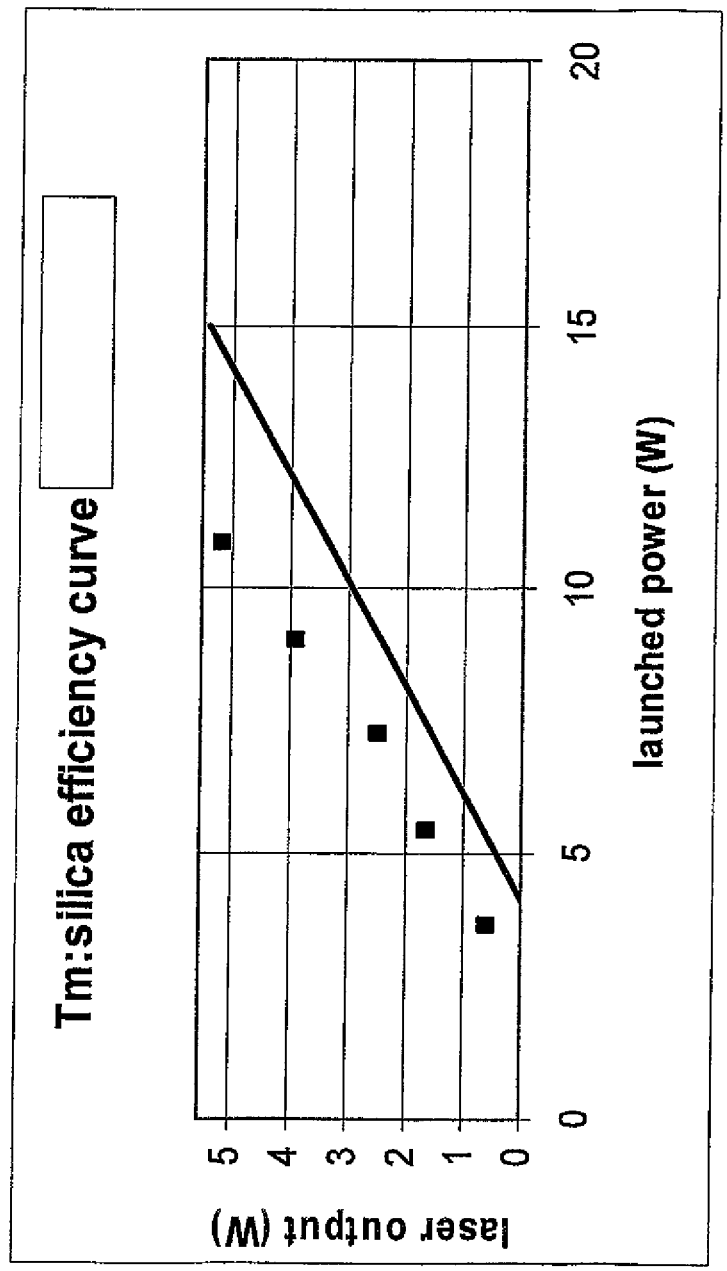
FIG. 8 is a graphical illustration of an efficiency curve, showing the efficiency of the fiber laser of FIG. 5.

Reference is now made to FIG. 8, which is a graphical illustration of an efficiency curve, showing the efficiency of a Tm:silica fiber laser as described with respect to Setup I. As shown in FIG. 8, slope efficiency was approximately 60%, with a threshold of about 3 W. The laser had a central wavelength of 1970 nm, both in the simulated and actual results.

Setup II.

Figure 9:
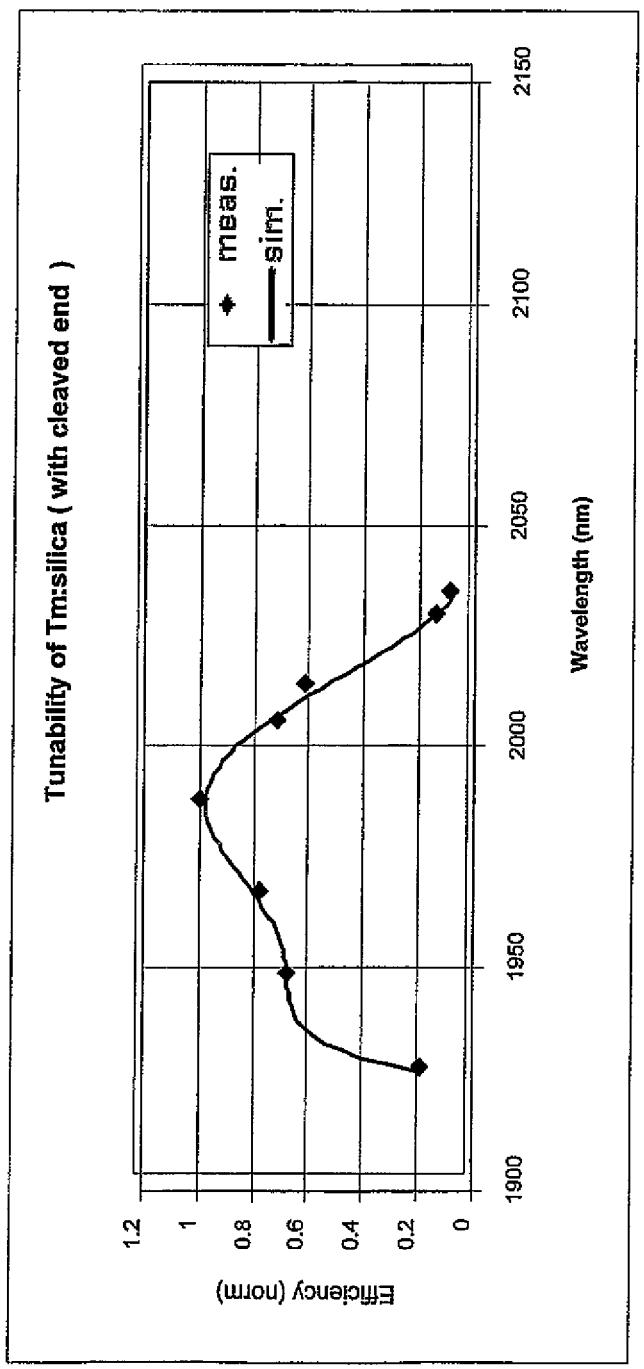
FIG. 9 is a graphical illustration of measured and simulated wavelengths at various powers, using the fiber laser of FIG. 6.

Reference is now made to FIG. 9, which is a graphical illustration of measured and simulated wavelengths at various powers, using the Tm:silica fiber laser described with respect to Setup II. As shown in FIG. 9, highest powers were obtained for wavelengths around 1970 nm. The longest possible lasing wavelength was 2040 nm.

Setup III.

Figure 10:
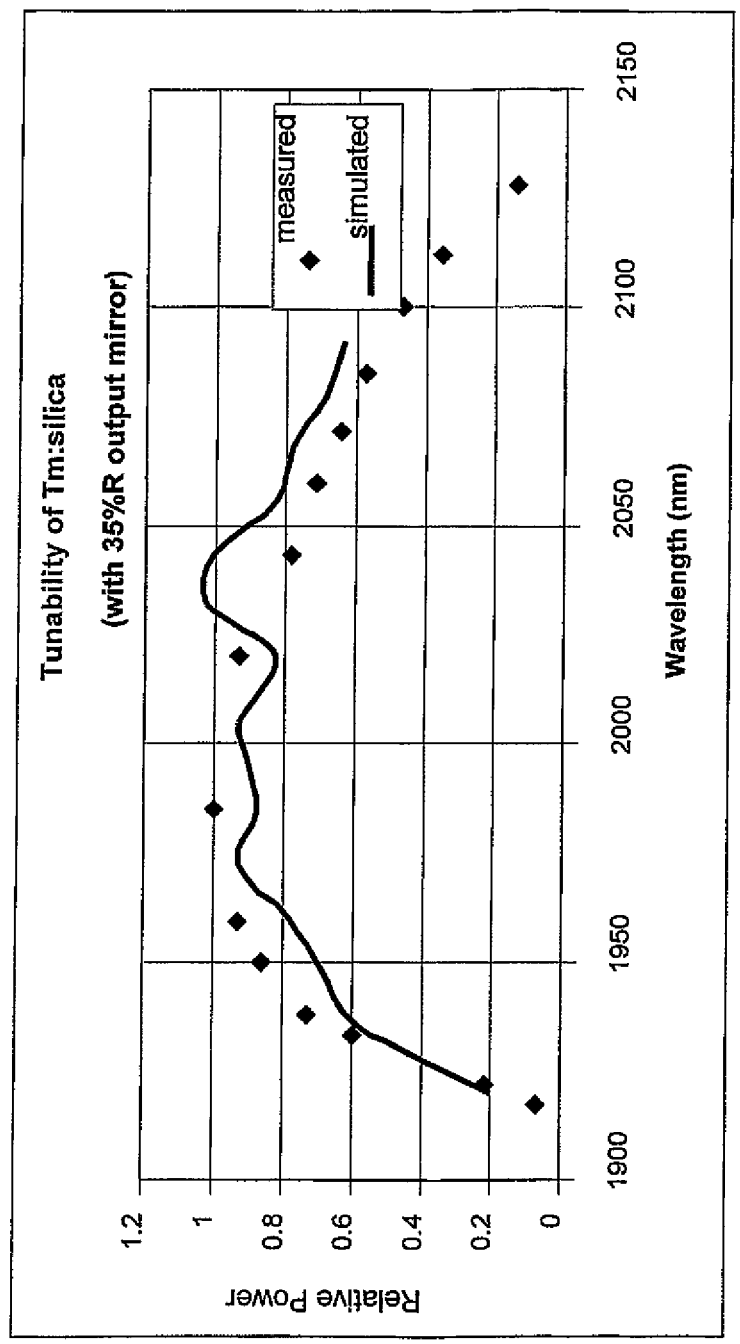
FIG. 10 is a graphical illustration of an efficiency curve, showing the efficiency of the fiber laser of FIG. 7.

Reference is now made to FIG. 10, which is a graphical illustration of measured and simulated wavelengths at various powers, using the Tm:silica fiber laser described with respect to Setup III. As shown in FIG. 10, lasing wavelengths of up to 2150 nm were obtained when pumped with about 12 W of pump power. With higher power, higher grating reflectivity, and/or with higher output coupler reflectivity, the curve may go beyond that number. Efficiency at 2100 nm is half of the maximum.

Figure 11:
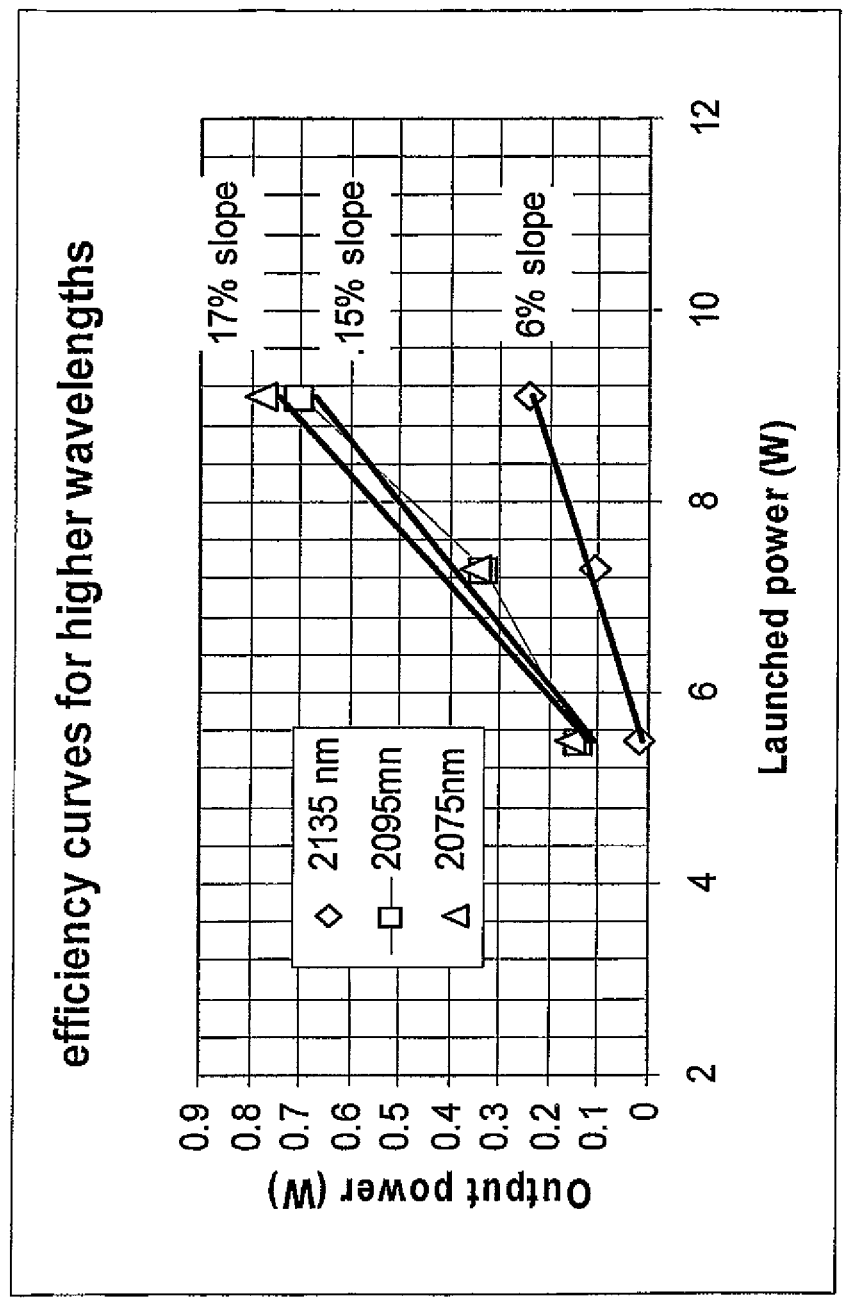
FIG. 11 is an illustration of efficiency curves for high wavelength lasing.

Reference is now made to FIG. 11, which is an illustration of efficiency curves for high wavelength lasing. According to the results shown in FIG. 11, one may expect to get 1 W of 2095 nm laser radiation and 250 mW at 2140 nm, when pumped with 12 W of 790 nm in this configuration. Higher powers should be obtainable by decreasing cavity loss, namely replacing the bulk grating with an FBG.

Figure 12:
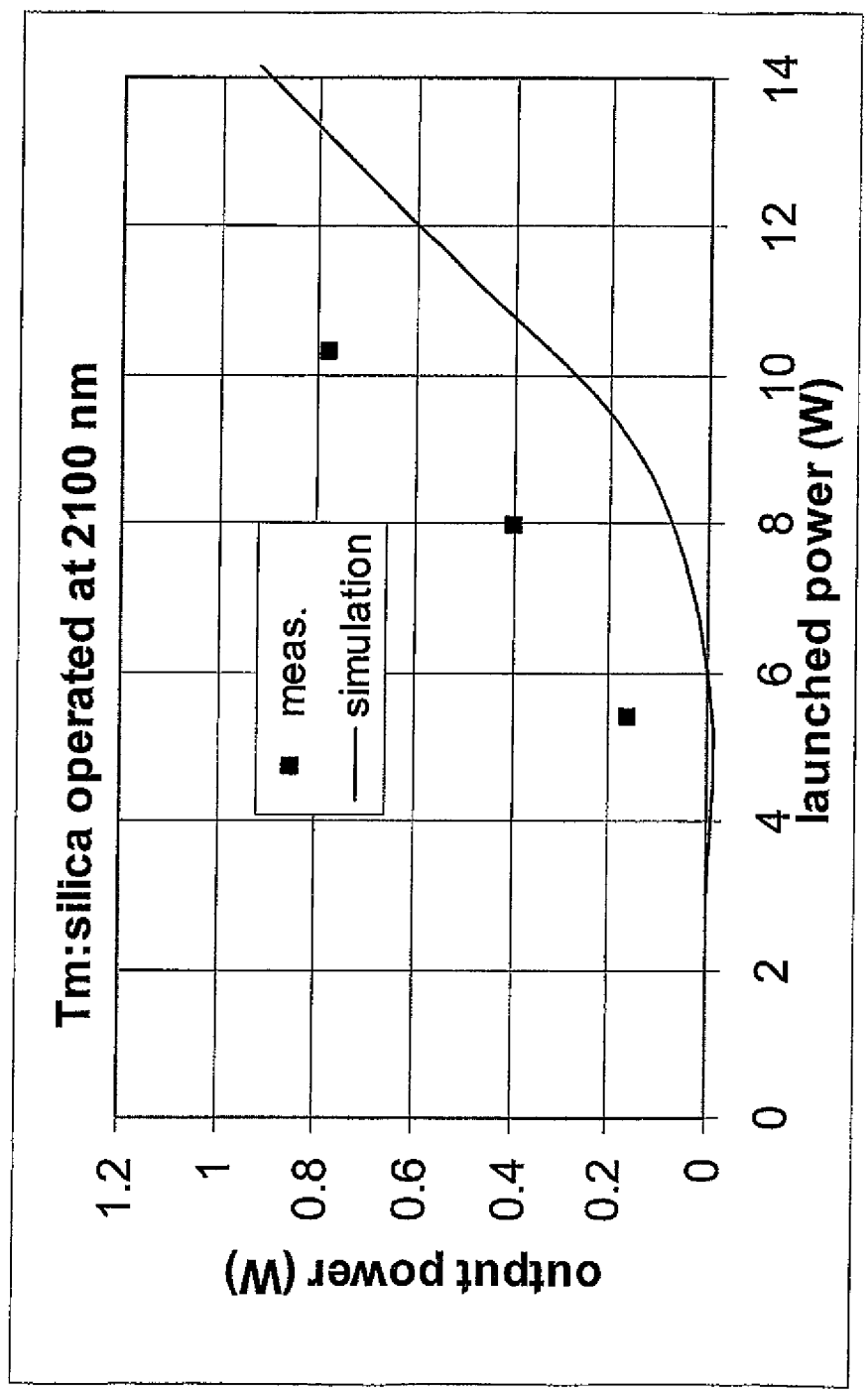
FIG. 12 is an illustration of measured and simulated output power at different launch powers for a wavelength output of 2100 nm.

Reference is now made to FIG. 12, which is an illustration of measured and simulated output power at different launch powers for a wavelength output of 2100 nm. As shown in FIG. 12, the efficiency of the bulk grating back coupling mechanism described in Setup III is approximately 30%.

Figure 13:
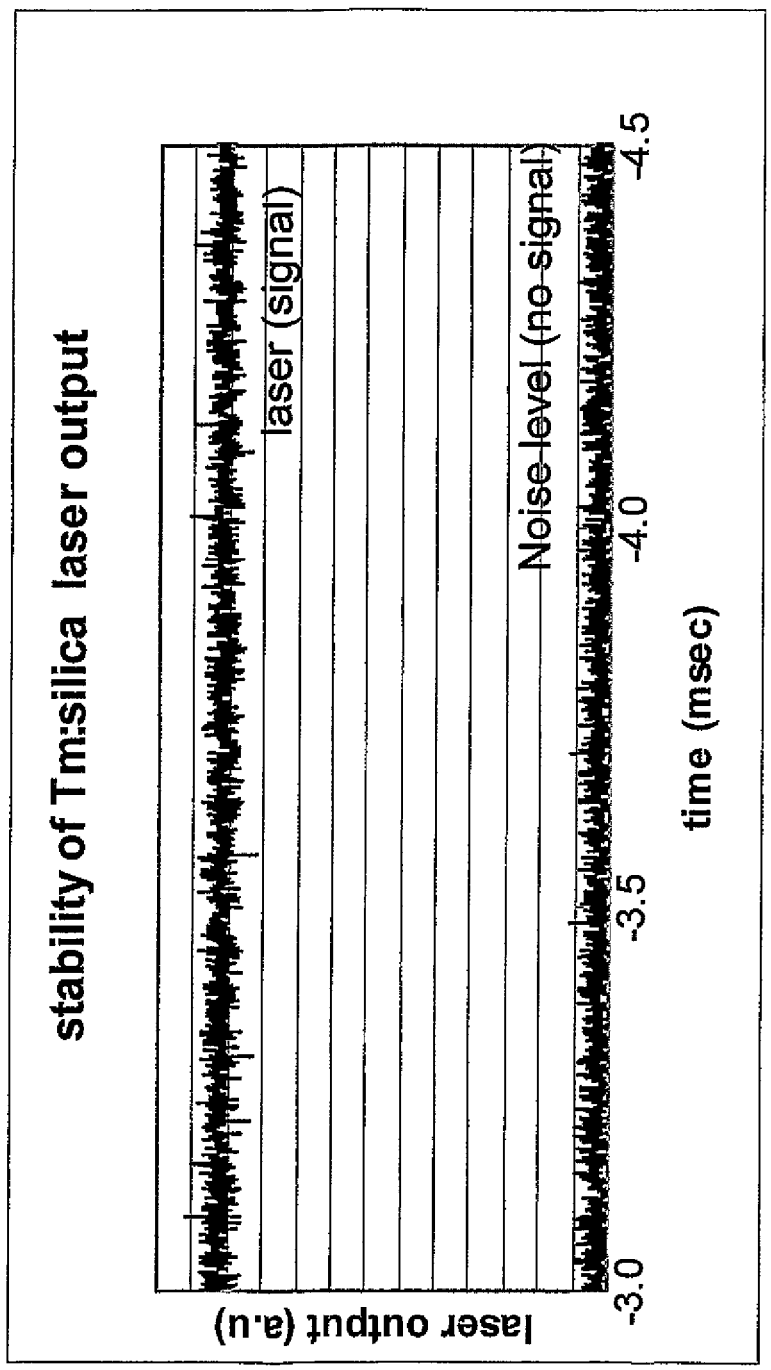
FIG. 13 is an illustration of laser stability while operated with high pump power.

Reference is now made to FIG. 13, which is an illustration of laser stability while operated with high pump power. It was shown that operation of the fiber laser of setup III was CW mode, without any significant fluctuations.

Results described herein were remarkable in that no other double clad Tm:silica fiber laser has been shown to produce such long wavelength operation. Results indicate that output is as desired. That is, the parameters defined herein result in continuous wave oscillation having long wavelengths with relatively high efficiency (10-20%).

Application of results to design of an efficient fiber laser is described. The bulk design of the laser presented above limits its applicability as a fiber laser for many applications. Limitations include the need to inject pump light through a bulk combiner and the need to couple reflected laser light into the core of the fiber with another bulk combiner, both of which significantly reduce the overall efficiency and stability of the fiber laser.

As such, a double cladding fiber Bragg grating (FBG) should be used, as described above. A new Tm:silica fiber with the following characteristics was found to be a good optical fiber 13 for use in the present invention:

TABLE 6

| fiber | parameters |
| --- | --- |
| Core size (um) | 11.5 |
| Core NA | 0.13 |
| Clad size (um) | 125 |
| Clad NA | 0.49 |
| Dopant conc. $10^{26}$ Atoms/m | 0.9 |
| Fiber length | 3-5 |
| Clad shape | octagon |

Example 2

Design Example: Influence of Parameters on Lasing Wavelength and Efficiency

As an example of selecting parameters, a 10/125 Tm fiber was selected. The lasing wavelength was fixed at 2095 nm, which is similar to Ho:YAG. Several different doping concentrations were tested. For each doping concentration, the fiber length and the reflectivity of the output coupler was varied. Parameters and values are listed in Table 7 below.

TABLE 7

| Parameter | Unit | Value |
| --- | --- | --- |
| N (Tm concentration) | Atoms/m$^3$ | variable |
| Core diameter | μm | 10 |
| Clad diameter | μm | 125 |
| Pump clad absorption | dB/m | variable |
| Signal core loss | dB/m | 0.22 |
| L (fiber length) | m | variable |
| R1 (reflectivity) | % | variable |
| R2 (reflectivity) | % | 80 |
| Pump power | W | 32 |
| Pump side | | R1 |

The constraints are as follows:
1) The maximum fiber length is 80-90% pump absorption in order to completely invert the gain media to ensure true CW lasing.
2) The reflectivity of the mirror and length can then be selected for efficient operation for a given dopant concentration.

Reference is now made to FIGS. 14A-14D, which are graphical illustrations showing laser efficiencies (in percent) at 2095 nm for four different concentrations as a function of fiber length and mirror reflectivity. The combinations of parameters used are depicted below in Table 8.

TABLE 8

| Tm concentration | | | Clad absorption 790 nm | 80% abs. length | 90% abs. length |
| --- | --- | --- | --- | --- | --- |
| Atoms/m$^3$ | ppm | % wt | (dB/m) | (m) | (m) |
| 1e25 | 1313 | 0.15 | 0.23 | 30.6 | 43.7 |
| 1.5e25 | 1926 | 0.22 | 0.36 | 21 | 30 |
| 2e25 | 2626 | 0.44 | 0.46 | 15 | 22 |
| 3.5e25 | 4466 | 0.51 | 0.78 | 7 | 10 |

Figure 14A:
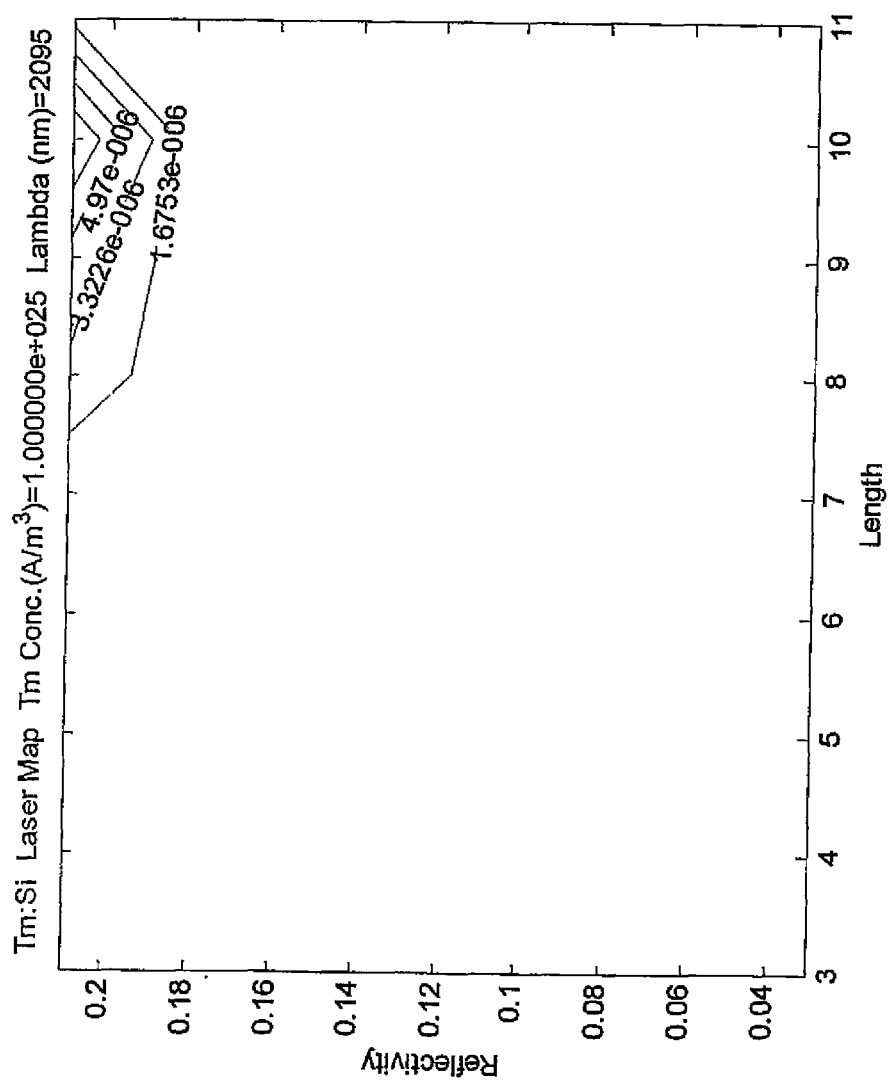
FIGS. 14A-14D are graphical illustrations showing laser efficiencies at 2095 nm for four different concentrations as a function of fiber length and mirror reflectivity.
Figure 14B:
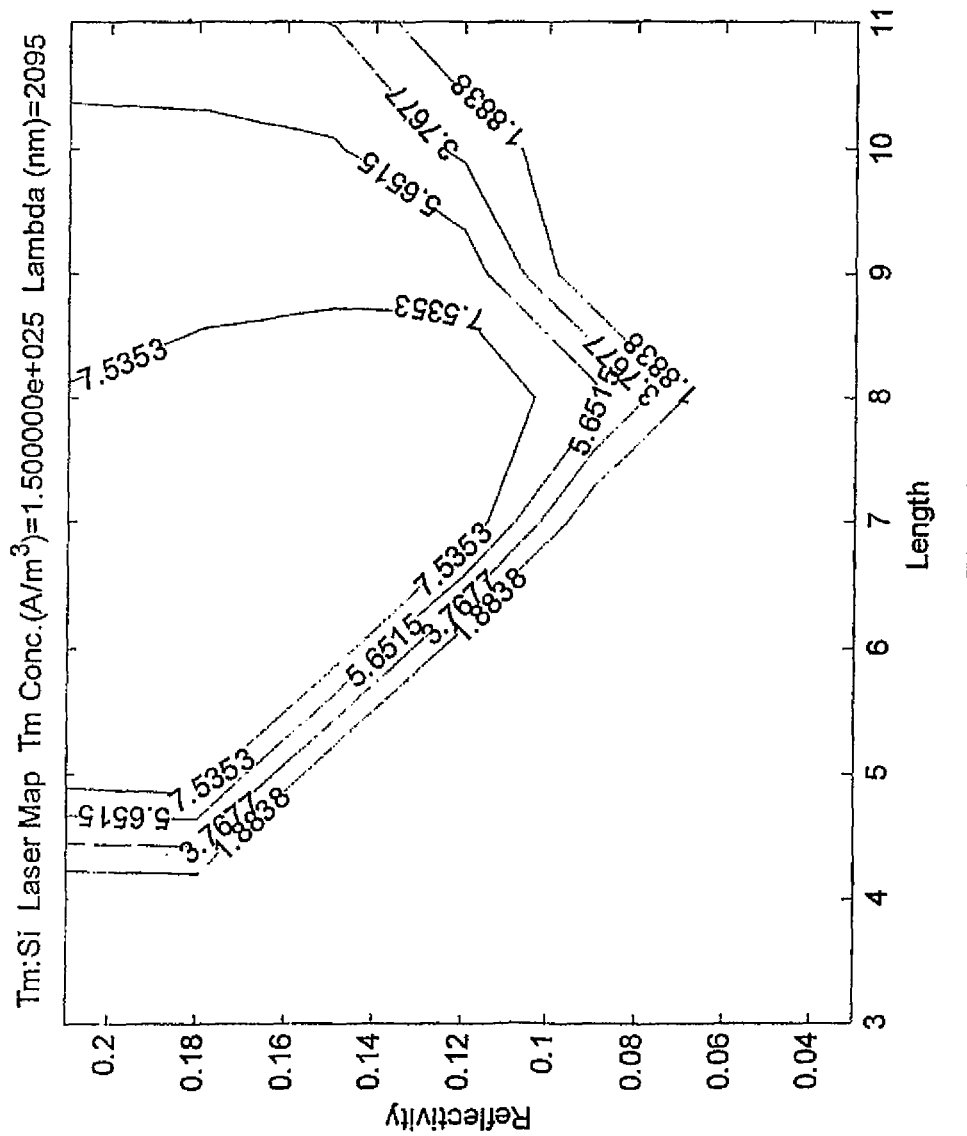
Figure 14C:
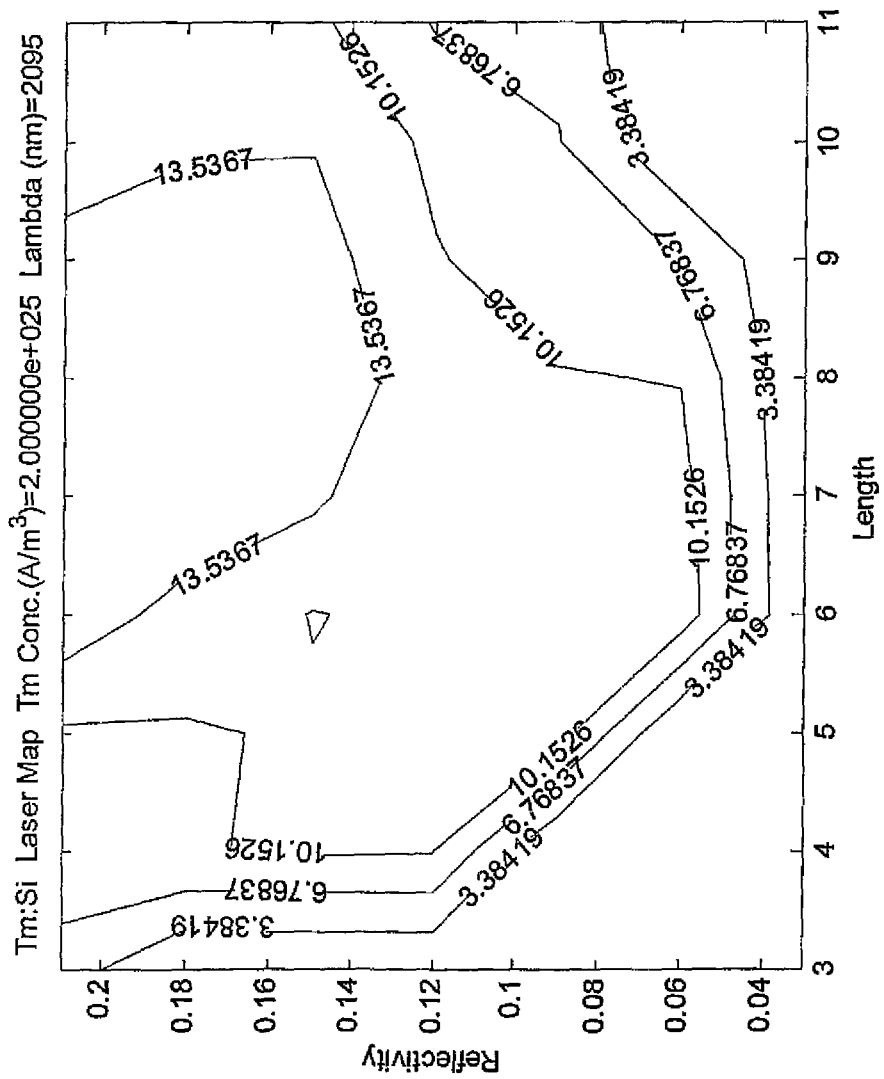
Figure 14D:
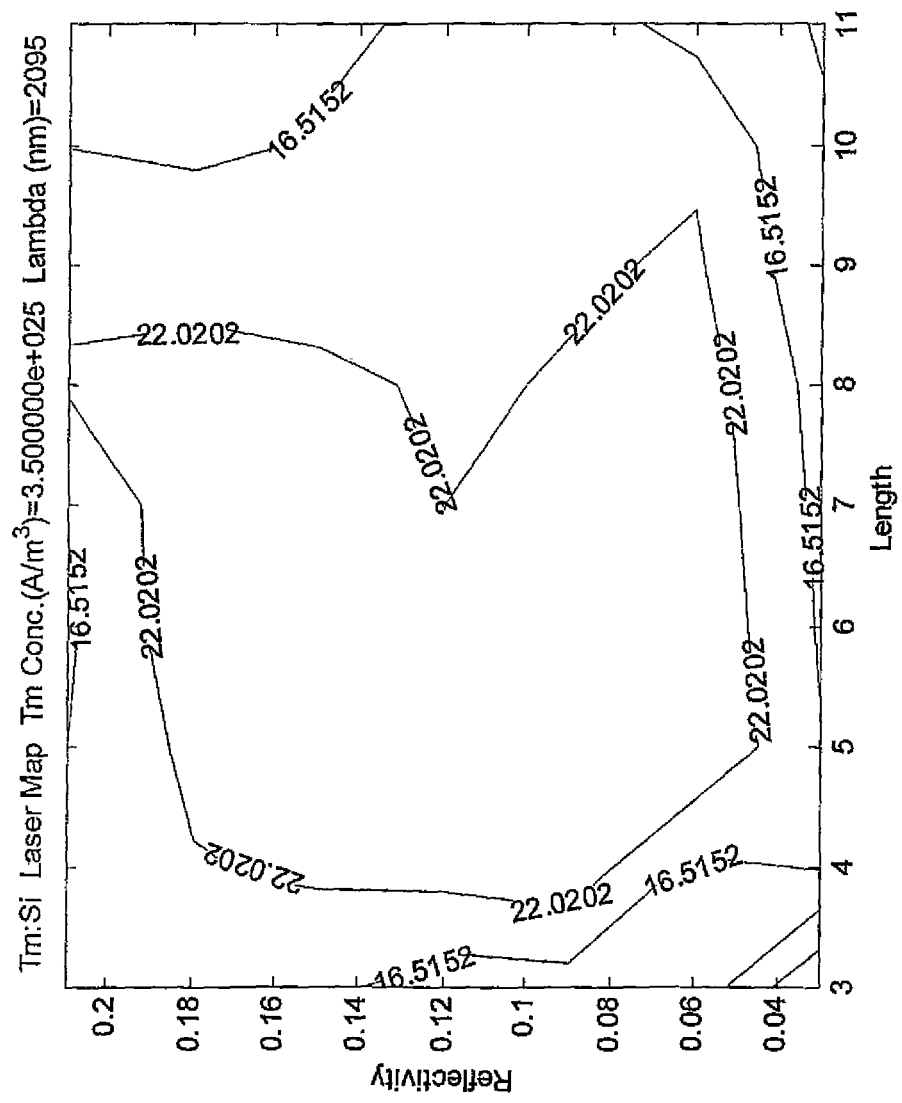

In this example, we see that if FBGs are placed to select 2095 nm, a laser will not be obtained at all for N=1.0e25 atoms/m$^3$, as shown in FIG. 14A. This may lead to the wrong conclusion that Tm can not support 2095 nm. The correct conclusion is that the laser in this configuration cannot lase at this wavelength. For N=1.5e251.0e25 atoms/m$^3$, as shown in FIG. 14B, a laser will only be obtained for output reflectivities greater than 8%, but the efficiencies will be very low since less than 50% of the pump power is absorbed. As the doping concentration increases to 2e25 atoms/m$^3$, as shown in FIG. 14C, the efficiency also increases. Optimal conversion efficiency occurs for an 8 m long fiber with a 20% output coupler with only 57% of the pump absorbed. In this example, the highest efficiency occurs for N=3.5e25 atoms/m$^3$, as shown in FIG. 14D. A 6 m fiber absorbs 66% of the pump. Even so, the laser has an overall efficiency of 22%, or 32 W of pump power producing 7 W of 2095 nm power.

These results show that the possibility of the fiber to lase at a given wavelength is dependent upon the doping concentration, fiber length, and mirror reflectivities. The shortest fiber possible is desired to limit the loss of the laser as the fiber absorbs the signal but a long fiber is required to have good pump absorption. The longest fiber is limited by the 80-90% inversion rule for CW operation.

Another example is shown for a commercially available Tm silica fiber. The laser is pumped with 10 W of 790 nm light. The lasing wavelength is chosen as 2097 nm, which is the natural lasing wavelength of Ho:YAG. In practice, the fiber design parameters (doping concentration, core diameter, clad diameter) are determined by the manufacturer. The combinations of parameters used are depicted below in Table 9.

TABLE 9

| Parameter | Unit | Value |
| --- | --- | --- |
| N (Tm concentration) | Atoms/m$^3$ | 9e25 |
| Core diameter | μm | 10 |
| Clad diameter | μm | 125 |
| Signal core loss | dB/m | 0.22 |
| L (fiber length) | m | variable |
| R1 (reflectivity) | % | variable |
| R2 (reflectivity) | % | 80 |
| Pump power | W | 32 |
| Pump side | | R1 |

Figure 15:
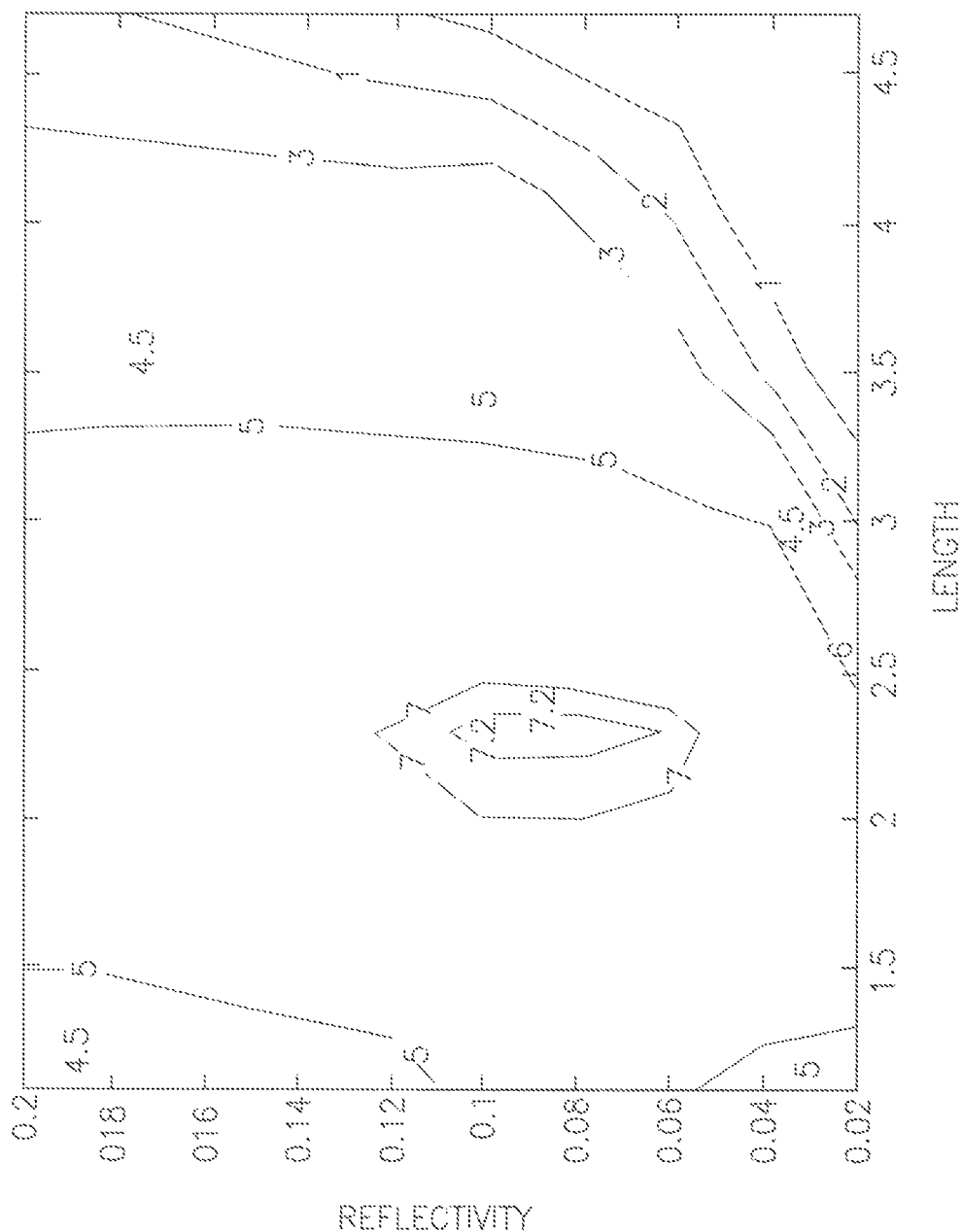
FIG. 15 is a graphical illustration of laser powers of a fiber with specific predefined parameters.

Reference is now made to FIG. 15, which is a graphical illustration showing laser powers of a fiber with the parameters shown in Table 9. Efficiency may be increased by raising the high reflector mirror coupler (R2) to >99%. Even with this configuration with an 8% output coupler and 2.25 m fiber, the overall efficiency is >20% with 65% pump absorption. From 32 W of pump power at 790 nm, 7 W of 2095 nm signal power is obtained.

Example 3

Depolarization of Laser Diode

An externally stabilized signal laser diode (Lumics LU1064M150-1001002, S/N 51440) was used. In order to obtain a narrow spectrum in pulsed operation, the FBG was moved from about 1.8 m from the diode to about 60 cm from the diode. In addition, a polarization controller was placed between the FBG and the diode to ensure that alignment of the feedback from the FBG was aligned to the polarization of the diode. All CW measurements were performed at 300 mA of pump current. All pulsed measurements were performed at 100 ns pulse, 100 kHz, and 1.2 A peak current (ILX LDP-3840).

The diode was evaluated in CW and pulsed operation, with and without the depolarizer. Temporal traces and spectra were recorded.

Figure 16:
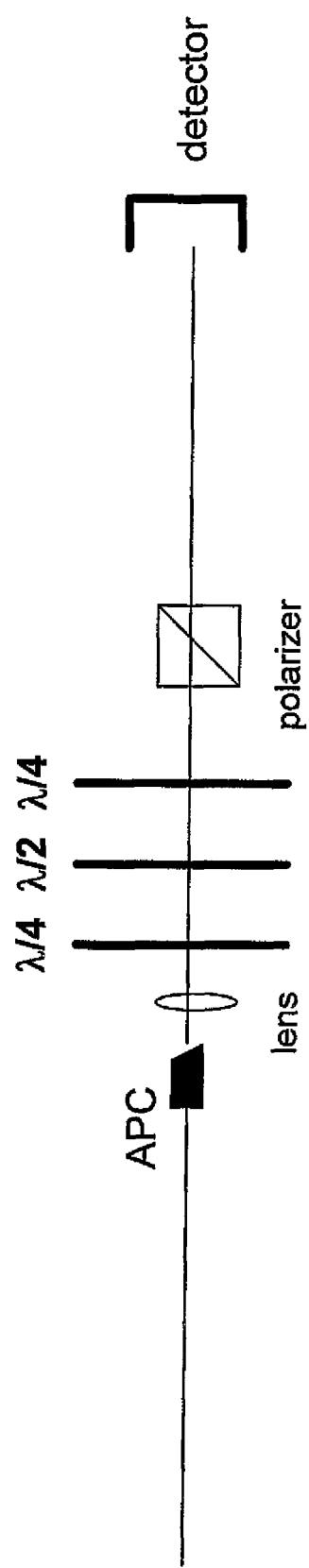
FIG. 16 is a schematic illustration of a polarization analyzer.

Depolarization was done using a depolarizer setup as described above with reference to FIG. 3. A polarization controller was used in the experiment. A polarization analyzer was used for measuring the polarization state purity. Reference is now made to FIG. 16, which is a schematic illustration of a polarization analyzer. Polarization state purity was measured by collimating and passing the source light through two λ/4 waveplates, one λ/2 waveplate, and a polarizing cube (Newport 10FC16PB.7). A detector detected the amount of polarization in both CW and pulsed operation.

Results:

The coherence length inside the fiber using the full width half maximum (FWHM) minus the resolution of the OSA (0.12 nm−0.6 nm=0.06 nm) from Table 6 is found to be 1.3 cm using Eq. 7. This is about 40 m of Fujikura Panda 980 fiber, with a beat length of 3.3 mm. Since 40 m of this fiber is not sufficient to scramble polarization completely, the length should be much larger making a standard Lyot type depolarizer impractical since the fiber length needs to be hundreds of meters.

The polarization was aligned by monitoring the power transmitted through the polarizer with a power meter for rough alignment. Fine alignment was performed using a photodiode and rotating the waveplates. The controller was adjusted such that no change in pulse shape was seen. In both CW and pulsed operation, more than 98% of the power leaving the polarizing cube was found to be linearly polarized.

Figures 17A, 17B:
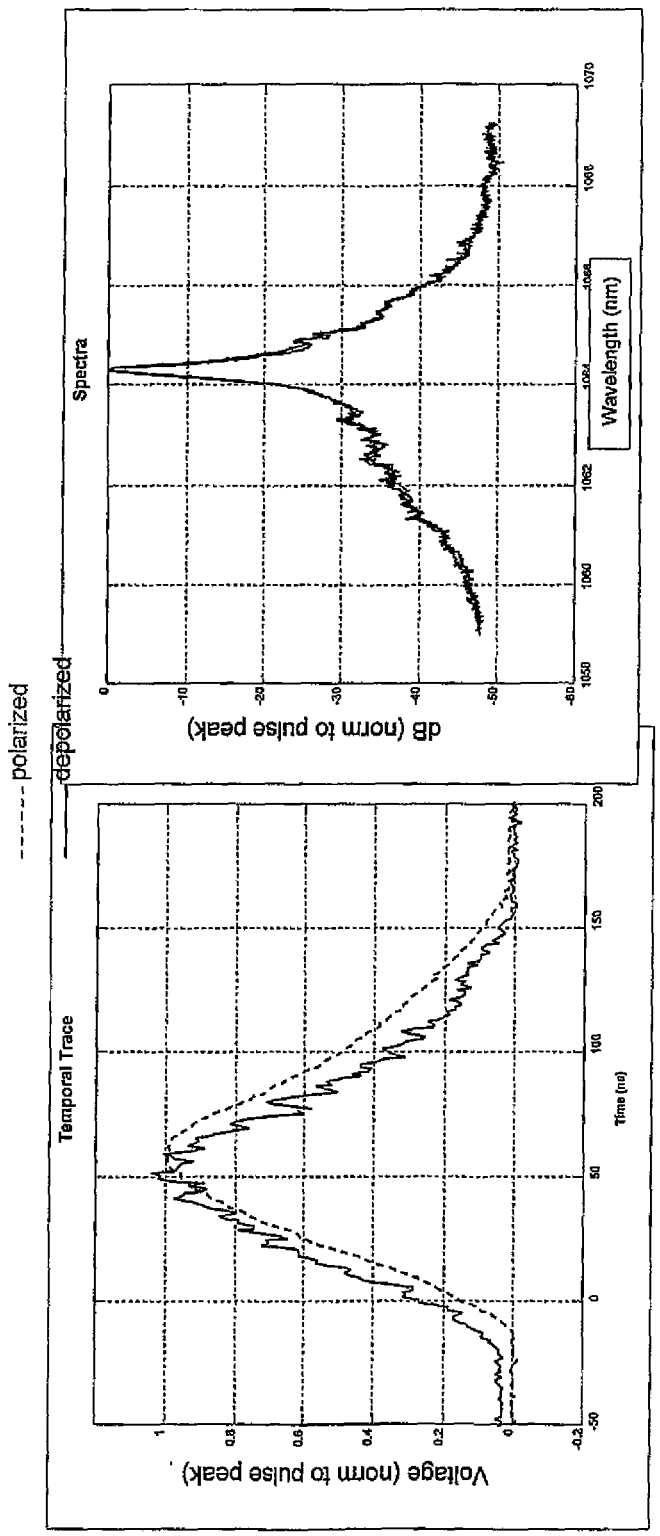
FIGS. 17A and 17B are graphical illustrations of temporal traces and spectra, respectively, of a laser diode before and after depolarization.

Reference is now made to FIGS. 17A and 17B, which are graphical illustrations of temporal traces and spectra, respectively, of the laser diode before and after depolarization. The temporal trace with the depolarizer is rough, as expected.

Temporal stability was also checked using an analog scope. Many pulses were viewed simultaneously. No gross shot to shot variations were seen.

Thus, it was found that a depolarizer such as the one of the present invention can effectively depolarize a diode operated in pulse mode. The depolarizer is a passive device, and does not alter the spectrum or pulse width of optical pulse. While small fluctuations in the depolarized pulse trace were seen, these fluctuations were not significant. The difference in path length between the two arms in the depolarizer must be much larger than the coherence length for effective depolarization.

Example 4

Band IV Power Laboratory Results

Figure 18:
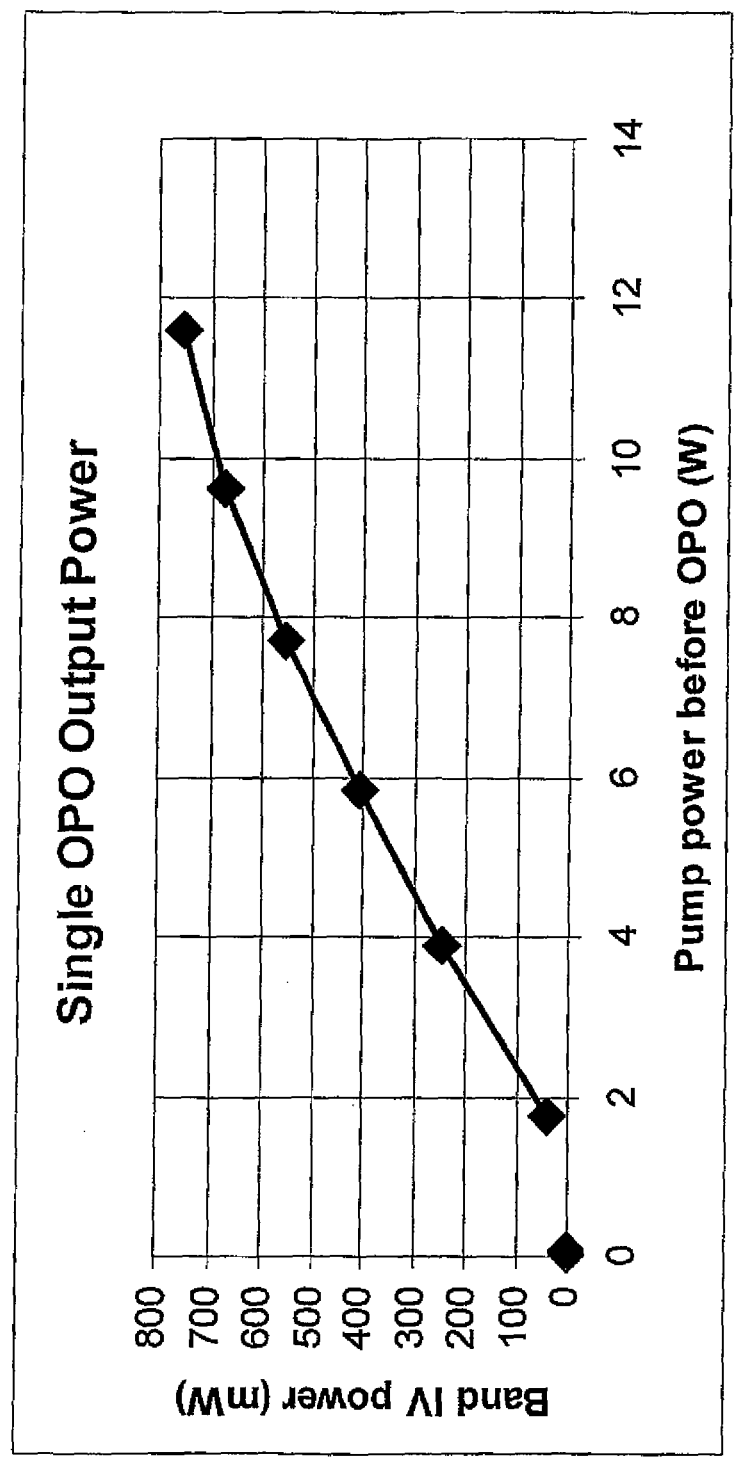
FIG. 18 is a graphical illustration of laboratory results for a depolarized fiber laser producing Band IV.

A fiber laser for producing Band IV wavelengths was tested in the laboratory. Reference is now made to FIG. 18, which is a graphical illustration of laboratory results for a depolarized fiber laser. Pump power is shown on the x-axis, and Band IV power is depicted on the Y-axis. Results show that, for example, a 10 W pump was able to produce 700 mW of band IV power with an efficiency of 70%. This indicates the feasibility of using a depolarized laser as described above for the purpose of producing Band IV wavelength.

High Power Fiber Isolator

Several components used in fiber lasers are essentially bulk optic components, such as isolators, certain filters, and high power modulators. In order to couple the light into these components, it first must be removed from the fiber, passed through the element as a collimated light beam, and then inserted back into the fiber. Solutions for coupling light to these bulk elements are commonly available for 300 mW of optical power. Certain specialty components can handle up to 10 Watts. Above that amount, and specifically for high power (in the 50 Watt range), there is a serious risk of burning associated with attempting to couple the light through the focusing lens and into the second fiber. The portion of the light which does not succeed to enter and propagate into the core of the fiber must be absorbed somewhere else, leading to heat and resulting in burning of the connector or unacceptable heating of the element. Heating can especially be a problem since mechanical alignment may be lost, leading to catastrophic failure, or the element may lose the desired performance due to the temperature changes.

Figure 20:
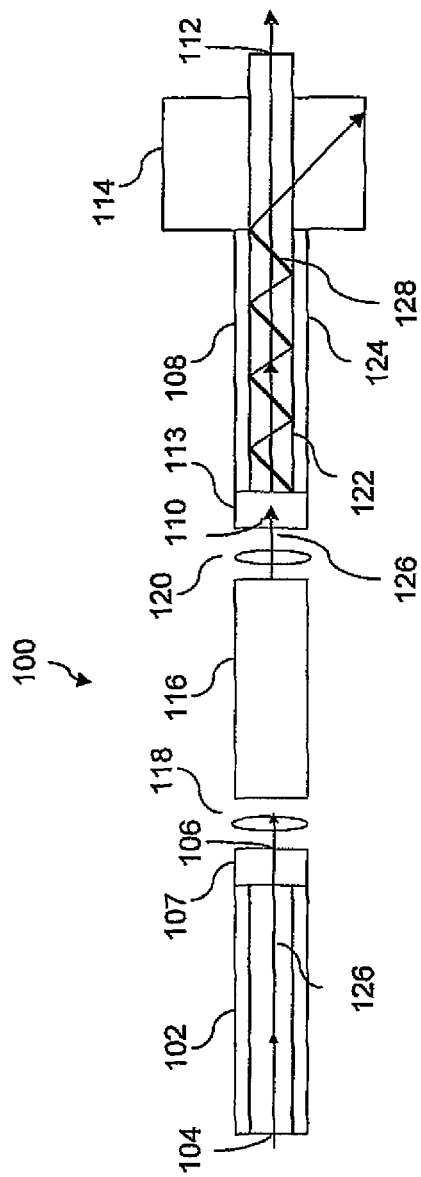
FIG. 20 is a schematic illustration of a system for recoupling of high power light in accordance with embodiments of the present invention.

Reference is now made to FIG. 20, which is a schematic illustration of a system 100 for refocusing high powered light into a second fiber. System 100 includes a first fiber 102 having a first fiber entry port 104, a first fiber exit port 106, and a first fiber end cap 107 positioned at first fiber exit port 106. A first lens 118 is positioned just outside of first fiber end cap 107, and is configured to collimate the light exiting from first fiber exit port 106. System 100 further includes a second fiber 108 having a second fiber entry port 110, a second fiber exit port 112 and a second fiber end cap 113 adjacent to second fiber entry port 110. A focusing lens 120 is positioned just outside of second fiber end cap 113, and is configured to focus light into the core of the second fiber 108. Second fiber 108 is a double clad fiber, having an inner clad 122 and an outer clad 124, and further includes a mode stripper 114 positioned between second fiber entry port 110 and second fiber exit port 112. The double clad allows for light which has not been launched into the core of second fiber 108 to be propagated through the outer clad 124 and to subsequently be removed by mode stripper 114 prior to exit of the focused light through second fiber exit port 112. System 100 may include a bulk optic component 116 positioned between first fiber exit port 104 and second fiber entry port 110, and more specifically, positioned between the collimating lens 118 and focusing lens 120. Bulk optic component 116 may be, for example, an isolator, a modulator (such as an electrooptic modulator or an acoustooptic modulator), or any other bulk optic component, including the absence of a component.

In some embodiments, outer clad 124 of second fiber 108 is a hard clad, which would enable second fiber 108 to be held in place within a connector. An example of a hard clad is, for example, a low optical index glass. If the first clad of this fiber is made from pure fused silica, then the second hard clad may be composed of fluorine doped silica. Such double and triple clad fibers currently exist in the market. Triple clad fibers may be used where the first clad is a hard glass and the second clad is a polymer. The polymer can be striped so essentially a glass double clad fiber remains. It will be appreciated by those skilled in the art that the terms double clad and triple clad refer to a clad that will be held rigidly and is made from a hard material. Thus, another embodiment is the use of quadruple clad fibers with a glass inner most clad. In some embodiments, end cap 113 is comprised of a multimode fiber having the same clad as outer clad 124.

Typically, numerical aperture (NA) of cores of fibers are between 0.06 to 0.15. When light is focused back into the fiber it should have a similar NA. Therefore, use of a standard fluorinated silica fiber with 0.22NA should be sufficient to catch all of the light which misses the core.

In another embodiment, first and second fibers 102 and 108 are double clad fibers. This way, a mode stripper can also be placed on the input fiber to limit and remove any backward propagating light that is not removed or absorbed elsewhere.

Figure 21:
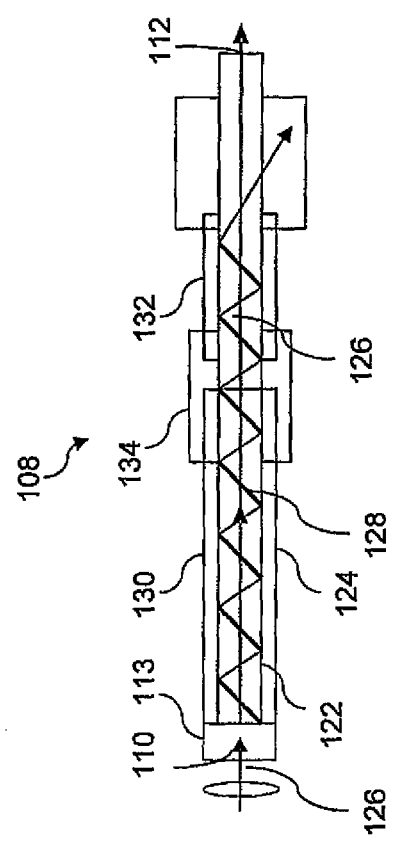
FIG. 21 is a schematic illustration of a spliced fiber from the system of FIG. 20, in accordance with embodiments of the present invention.

Reference is now made to FIG. 21, which is a schematic illustration of second fiber 108, in accordance with embodiments of the present invention. In the embodiment depicted in FIG. 21, second fiber 108 is spliced, resulting in a proximal portion 130 and a distal portion 132. Outer clad 124 differs in each of proximal and distal portions 130 and 132. In one embodiment, outer clad 124 of proximal portion 130 is comprised of glass, to provide rigidity as described above, while outer clad 124 of distal portion 132 is comprised of a polymeric material. This configuration enables a portion of outer clad 124 (in a region of mode stripper 114) to be stripped away, thus allowing for removal of light by mode stripper 114. Proximal portion 130 and distal portion 132 are joined together in a connecting region 134, wherein a polymer coating is applied to outer clad 124. In some embodiments, the polymer coating of connecting region 134 is the same polymer as the one used for outer clad 124 of distal portion 132.

Another source of potential unwanted heat is the back-reflection from the air-fiber interface. This should be approximately 5% if no anti-reflection (AR) coating is used for silica fibers. Typically, the connector is angled to prevent back-reflection into the core, but this light must either be absorbed into the clad or will leak outside of the fiber, if no mode stripper 114 is used. As an example, if a 50 W isolator is desired, then 2.5 W will be lost on the air-fiber interface of each connector. With an AR coating of R<0.5%, the number will be reduced to 250 mW.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A fiber laser comprising:
    a laser cavity for producing 2.075-2.3 micrometer band wavelengths comprising:
        a double clad Tm:silica optical fiber having an inner clad, an outer clad surrounding said inner clad, and a core surrounded by said inner clad, said inner clad having at least one pump power entry point, and said core having a lasing input/output end and a reflecting end;
        a first reflector positioned at said input/output end, and a second reflector positioned at said reflecting end, said first reflector having 90-100% reflectivity and said second reflector having more than 5% reflectivity;
    at least one energy source for pumping power into said laser cavity via said pump power entry point; and
    at least one coupling mechanism for delivering said pump power from said energy source to said laser cavity.

2. The fiber laser of claim 1, wherein an outer diameter of said optical fiber is in a range of 80-400 micrometers.

3. The fiber laser of claim 2, wherein an outer diameter of said optical fiber is approximately 125 micrometers.

4. The fiber laser of claim 1, wherein said optical fiber comprises a dopant concentration in a range of 300-35000 ppm.

5. The fiber laser of claim 4, wherein said optical fiber comprises a dopant concentration in a range of 12000-22000 ppm.

6. The fiber laser of claim 1, wherein said optical fiber is 0.5-12 m long.

7. The fiber laser of claim 1, wherein said optical fiber is configured to absorb 50-90% of said pumped power.

8. The fiber laser of claim 1, wherein said optical fiber is a single mode fiber.

9. The fiber laser of claim 1, wherein said optical fiber is selected from the group consisting of: Tm:silica, Ho:silica; Yb, Ho:silica; Er, Yb, Tm:silica; Er, Tm:silica; Yb, Tm:silica; Tm, Ho:silica; Er, Yb, Ho:silica; Tm:ZBLAN, Ho:ZBLAN; Yb, Ho:ZBLAN; Er, Yb, Tm:ZBLAN; Er, Tm:ZBLAN; Yb, Tm:ZBLAN; Tm, Ho:ZBLAN; Er, Yb, Ho:ZBLAN; Tm:fluouride, Ho:fluouride; Yb, Ho:fluouride; Er, Yb, Tm:fluouride; Er, Tm:fluouride; Yb, Tm:fluouride; Tm, Ho:fluouride; Er, Yb, Ho:fluouride; Tm:chalcogenide; Ho:chalcogenide; Nd:chalcogenide; Er:chalcogenide; Yb, Ho:chalcogenide; Yb, Tm:chalcogenide; Tm, Ho:chalcogenide; or Yb, Ho:chalcogenide; Pr:chalcogenide; Dy:chalcogenide; Tb:chalcogenide.

10. The fiber laser of claim 1, wherein said second reflector has a reflectivity of 10-40%.

11. The fiber laser of claim 1, wherein said first reflector is a double clad fiber Bragg grating.

12. The fiber laser of claim 11, wherein said first reflector is chirped.

13. The fiber laser of claim 1, wherein said second reflector is a double clad fiber Bragg grating.

14. The fiber laser of claim 13, wherein said second reflector is chirped.

15. The fiber laser of claim 1, wherein said second reflector is a single clad fiber Bragg grating.

16. The fiber laser of claim 1, wherein said coupling mechanism is tapered.

17. The fiber laser of claim 1, wherein said coupling mechanism is a fiber bundle.

18. The fiber laser of claim 1, wherein a core diameter of said optical fiber is around 10 μm and an outer diameter of said optical fiber is in a range of 80-400 micrometers.

19. The fiber laser of claim 18, wherein an outer diameter of said optical fiber is approximately 125 micrometers.

* * * * *